United States Patent
Beauvais et al.

(10) Patent No.: US 11,629,388 B2
(45) Date of Patent: Apr. 18, 2023

(54) STEEL SHEET FOR MANUFACTURING PRESS HARDENED PARTS, PRESS HARDENED PART HAVING A COMBINATION OF HIGH STRENGTH AND CRASH DUCTILITY, AND MANUFACTURING METHODS THEREOF

(71) Applicant: ArcelorMittal, Luxembourg (LU)

(72) Inventors: Martin Beauvais, Marange Silvange (FR); Alice Dumont, Metz (FR); Alexandre Gibot, Metz (FR); Astrid Perlade, Le Ban-Saint-Martin (FR); Kangying Zhu, Metz (FR)

(73) Assignee: ARCELORMITTAL, Luxembourg (LU)

( * ) Notice: Subject to any disclaimer, the term of this patent is extended or adjusted under 35 U.S.C. 154(b) by 428 days.

(21) Appl. No.: 16/616,937

(22) PCT Filed: Jun. 1, 2018

(86) PCT No.: PCT/IB2018/053950
§ 371 (c)(1),
(2) Date: Nov. 25, 2019

(87) PCT Pub. No.: WO2018/220598
PCT Pub. Date: Dec. 6, 2018

(65) Prior Publication Data
US 2020/0149129 A1    May 14, 2020

(30) Foreign Application Priority Data

Jun. 2, 2017  (WO) ................. PCT/IB2017/053282

(51) Int. Cl.
*C21D 9/50*    (2006.01)
*C21D 9/46*    (2006.01)
(Continued)

(52) U.S. Cl.
CPC .............. *C21D 9/50* (2013.01); *B32B 15/013* (2013.01); *C21D 6/002* (2013.01); *C21D 6/005* (2013.01); *C21D 6/008* (2013.01); *C21D 8/0405* (2013.01); *C21D 8/0426* (2013.01); *C21D 8/0436* (2013.01); *C21D 8/0463* (2013.01); *C21D 9/46* (2013.01); *C22C 38/001* (2013.01); *C22C 38/002* (2013.01); *C22C 38/02* (2013.01); *C22C 38/06* (2013.01); *C22C 38/22* (2013.01); *C22C 38/26* (2013.01); *C22C 38/28* (2013.01);
(Continued)

(58) Field of Classification Search
CPC .... B21D 22/022; B21D 22/208; B23K 11/11; B23K 11/163; B23K 11/166; B23K 2101/185; B23K 2101/32; B23K 2103/04; B23K 26/21; B23K 26/324; B23K 35/30; B23K 35/3053; B23K 35/3073; B23K 35/308; B23K 35/3086; B32B 15/013; B32B 2605/00; C21D 1/19; C21D 1/673; C21D 2211/001; C21D 2211/002; C21D 2211/003; C21D 2211/005; C21D 2211/008; C21D 6/002; C21D 6/005; C21D 6/008; C21D 8/0226; C21D 8/0236; C21D 8/0257; C21D 8/0263; C21D 8/0273; C21D 8/0278; C21D 8/0405; C21D 8/0426; C21D 8/0436; C21D 8/0463; C21D 9/46; C21D 9/50; C22C 38/001; C22C 38/002; C22C 38/02; C22C 38/04; C22C 38/06; C22C 38/12; C22C 38/14; C22C 38/22; C22C 38/26; C22C 38/28; C22C 38/32; C22C 38/38; C23C 2/02; C23C 2/06; C23C 2/12
See application file for complete search history.

(56) References Cited

U.S. PATENT DOCUMENTS 6,296,805 B1  10/2001  Laurent et al.
9,611,517 B2   4/2017  Laurent et al.
(Continued)

FOREIGN PATENT DOCUMENTS

CN  104769138 A  7/2015
CN  106334875 A  1/2017
(Continued)

OTHER PUBLICATIONS

P. Dietsch and D. Hasenpouth: "Crash Ductility and Numerical Modeling of Usibor® 1500 Fracture behavior," Proceedings of the International Automotive Body Congress, Frankfurt 2015.
(Continued)

*Primary Examiner* — Jenny R Wu
(74) *Attorney, Agent, or Firm* — Davidson, Davidson & Kappel, LLC

(57) ABSTRACT

A steel sheet for the manufacture of a press hardened part is provided, having a composition of: 0.15%≤C≤0.22%, 3.5%≤Mn<4.2%, 0.001%≤Si≤1.5%, 0.020%≤Al≤0.9%, 0.001%≤Cr≤1%, 0.001%≤Mo≤0.3%, 0.001%≤Ti≤0.040%, 0.0003%≤B≤0.004%, 0.001%≤Nb≤0.060%, 0.001%≤N≤0.009%, 0.0005%≤S≤0.003%, 0.001%≤P≤0.020%. A microstructure has less than 50% ferrite, 1% to 20% retained austenite, cementite, such that the surface density of cementite particles larger than 60 nm is lower than $10^7/mm^2$, and a complement of bainite and/or martensite, the retained austenite having an average Mn content of at least 1.1*Mn %. Press-hardened steel part obtained by hot forming the steel sheet, and manufacturing methods thereof.

19 Claims, 1 Drawing Sheet

(51) Int. Cl.

| | | |
|---|---|---|
| *C21D 8/04* | (2006.01) | |
| *B32B 15/01* | (2006.01) | |
| *C21D 6/00* | (2006.01) | |
| *C22C 38/38* | (2006.01) | |
| *C22C 38/28* | (2006.01) | |
| *C22C 38/26* | (2006.01) | |
| *C22C 38/22* | (2006.01) | |
| *C22C 38/06* | (2006.01) | |
| *C22C 38/02* | (2006.01) | |
| *C22C 38/00* | (2006.01) | |
| *C22C 38/32* | (2006.01) | |

(52) U.S. Cl.
CPC .............. *C22C 38/32* (2013.01); *C22C 38/38* (2013.01); *B32B 2605/00* (2013.01); *C21D 2211/001* (2013.01); *C21D 2211/002* (2013.01); *C21D 2211/003* (2013.01); *C21D 2211/005* (2013.01); *C21D 2211/008* (2013.01)

(56) References Cited

U.S. PATENT DOCUMENTS

| | | | |
|---|---|---|---|
| 10,590,522 | B2 | 3/2020 | Oh et al. |
| 2001/0042393 | A1 | 11/2001 | Kefferstein et al. |
| 2015/0361532 | A1 | 12/2015 | Nam et al. |
| 2017/0130292 | A1 | 5/2017 | Mohanty et al. |
| 2017/0260599 | A1 | 9/2017 | Puerta Velasquez et al. |
| 2017/0306437 | A1 | 10/2017 | Nakagawa |
| 2017/0321294 | A1* | 11/2017 | Arlazarov ................ C21D 9/46 |
| 2017/0341187 | A1 | 11/2017 | Cretteur et al. |
| 2018/0002800 | A1 | 1/2018 | Hasegawa et al. |
| 2018/0030564 | A1 | 2/2018 | Hasegawa et al. |
| 2019/0093191 | A1 | 3/2019 | Nakagawa et al. |
| 2020/0157666 | A1 | 5/2020 | Sakakibara et al. |

FOREIGN PATENT DOCUMENTS

| | | | |
|---|---|---|---|
| EP | 1865086 | A1 | 12/2007 |
| EP | 1881083 | A1 | 1/2008 |
| EP | 2137327 | B1 | 5/2012 |
| EP | 2708610 | A1 | 3/2014 |
| EP | 3181715 | A1 | 6/2017 |
| EP | 3181715 | A1 | 6/2017 |
| EP | 3502291 | A1 | 6/2019 |
| EP | 3533558 | A1 | 9/2019 |
| FR | 2780984 | A1 | 1/2000 |
| FR | 2807447 | A1 | 10/2001 |
| JP | H06316729 | A | 11/1994 |
| JP | 6103165 | B1 | 3/2017 |
| KR | 1020140050690 | A | 4/2014 |
| KR | 20160077583 | A | 7/2016 |
| KR | 101696121 | B1 | 1/2017 |
| WO | 2016063467 | A1 | 4/2016 |
| WO | WO-2016079675 | A1 * | 5/2016 ............... C21D 1/18 |
| WO | WO2016113788 | A1 | 7/2016 |
| WO | 2017006159 | A1 | 1/2017 |
| WO | 2017/068756 | A1 | 4/2017 |
| WO | 2016113789 | A1 | 4/2017 |

OTHER PUBLICATIONS

Rietveld, H., "A profile refinement method for nuclear and magnetic structures", Journal of applied Crystallography, 2(2), 65-71, 1969.
D. J. Dyson, and B. Holmes: "Effect of alloying additions on the lattice parameter austenite", Journal of the Iron and Steel Institute, 1970, 208, 469-474.
Heller, Thomas; Nuss, Andreas, "Mechanical properties and behaviour of hot-rolled retained-austenite (TRIP)- and dual-phase steels", Proceedings of the International Symposium on Transformation and Deformation Mechanisms in Advanced High-Strength Steels, Vancouver, BC, Canada, Aug. 24-27, 2003 (2003), Metallurgical Society of CIM, Montreal, Que, (Aug. 7, 2003), pp. 8-20.
Munera D D; Pic A; Abou-Khalil D; Shmit F; Pinard F, "Innovative presshardened steel based laser welded blanks solutions for weight savings and crash safety improvements", SAE International Journal of Materials and Manufacturing, (Apr. 1, 2009), vol. 1, No. 1, ISSN 1946-3979, pp. 472-479.
Kang Minjung et al, "Laser welding for hot-stamped tailor-welded blanks with high-strength steel/high-energy absorption steel", Journal of Laser Applications, American Institute of Physics, 2 Huntington Quadrangle, Melville, NY 11747, Aug. 2014, vol. 26, No. 3.
R. Vierstraete, W. Ehling, F. Pinard, L. Cretteur, A. Pic, and Q. Yin, "Laser ablation for hardening laser welded steel blanks", Jan. 26, 2010, URL: https://www.industrial-lasers.com/articles/2010/01/laser-ablation_for.html.
International Search Report of PCT/IB2018/053950, dated Oct. 23, 2018.
International Search Report of PCT/IB2017/053282, dated Mar. 2, 2018.
Garcia-Mateo et al: "On Measurement of Carbon Content in Retained Austenite in a Nanostructured Bainitic Steel", Springer Science+ Business Media, LLC 2011, published online 1-7.
Shima Pashangeh et al: "Detection and Estimation of Retained Austenite in a High Strength Si-Bearing Bainite-Martensite-Retained Austenite Micro-Composite Steel after Quenching and Bainitic Holding" (Q&B), Metal 2019, pp. 1-21.
S.H. Magner et al: "A Historical Review of Retained Austenite and its Measurement by X-Ray Diffraction", JCPDS—International Centre for Diffraction Data 2002, Advances in Analysis in X-Ray Analysis, vol. 45, pp. 1-6.
C.P. Scott et al: "A Study of the Carbon Distribution in Retained Austenite", Science Direct 2007, 489-492.

* cited by examiner

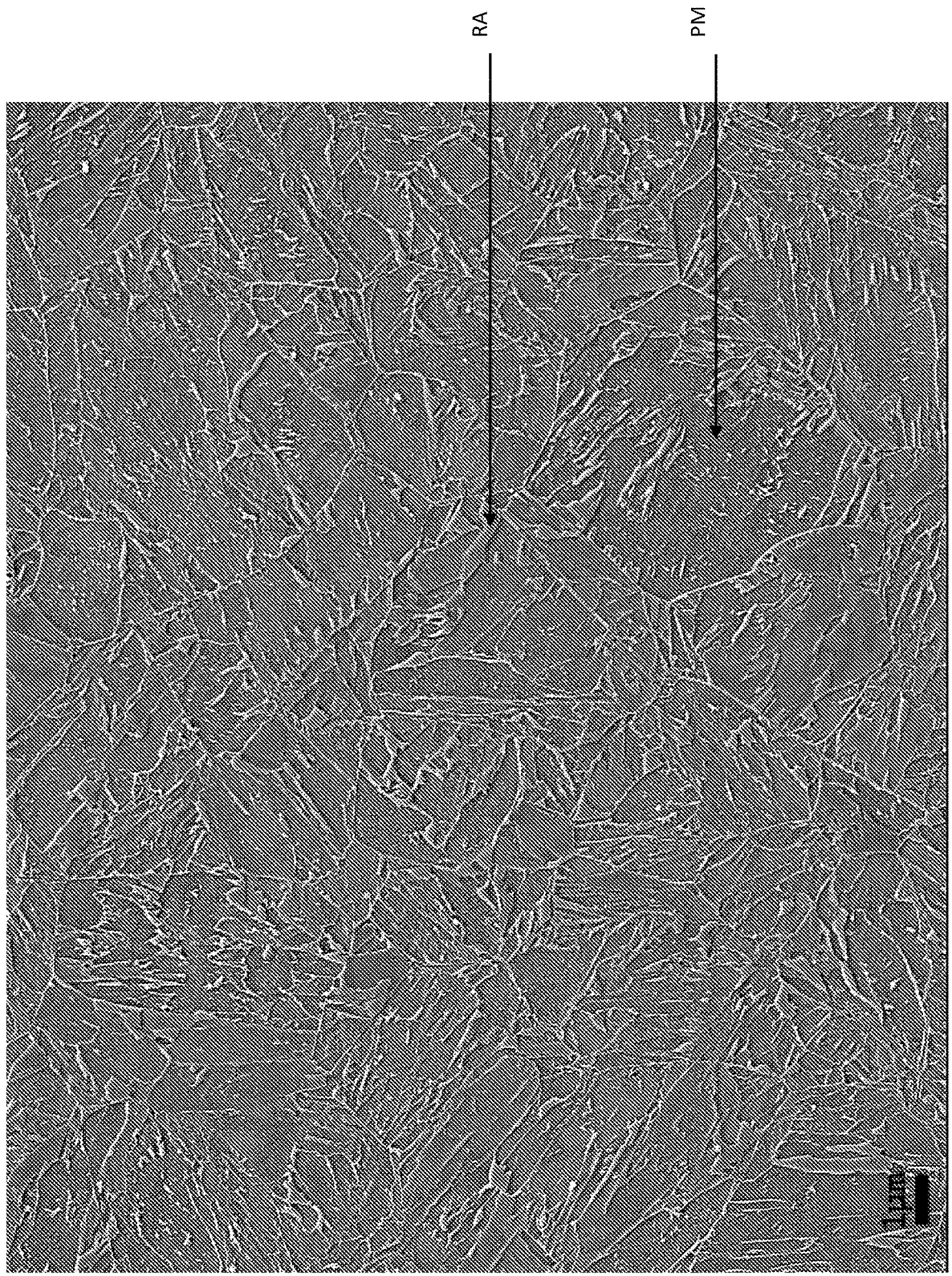

STEEL SHEET FOR MANUFACTURING PRESS HARDENED PARTS, PRESS HARDENED PART HAVING A COMBINATION OF HIGH STRENGTH AND CRASH DUCTILITY, AND MANUFACTURING METHODS THEREOF

The present invention relates to steel sheets that are hot formed to produce parts, and press hardened through a cooling step achieved by holding the parts in the press tool. These parts are used as structural elements in automotive vehicles for anti-intrusion or energy absorption functions. Such parts can also be used for example for the fabrication of tools or parts for agricultural machinery.

BACKGROUND

In such type of applications, it is desirable to produce steel parts that combine high mechanical strength, high impact resistance, good corrosion resistance and dimensional accuracy. This combination is particularly desirable in the automobile industry, where attempts are being made to significantly reduce the weight of the vehicles. Automotive parts such as anti-intrusion and structural parts, especially front or rear rails, roof rails and B-pillars, chassis parts such as lower control arms, engine cradles, as well as other parts that contribute to the safety of automotive vehicles such as bumpers, door or center pillar reinforcements, need more particularly these properties. This weight reduction can be achieved in particular thanks to the use of steel parts with a martensitic or bainitic-martensitic microstructure.

The fabrication of parts of this type is described in prior art publications FR 2 780 984 and FR 2 807 447, according to which a blank cut in a steel sheet for heat treatment and pre-coated with a metal or metal alloy is heated in a furnace and then hot formed. Holding the part in the tooling after forming has been performed makes it possible to achieve a rapid cooling that leads to the formation of hardened microstructures that have very high mechanical characteristics. A process of this type is known as press hardening.

The mechanical characteristics of the parts thus obtained are generally evaluated by means of tensile strength and hardness tests. The above cited documents thus disclose manufacturing processes which allow achieving a tensile strength TS of 1500 MPa starting from a steel blank having an initial tensile strength TS of 500 MPa before heating and rapid cooling.

However, the service conditions of certain hardened and coated parts require not only a high level of tensile strength TS but also a good ductility. The ductility of the parts is for example evaluated by measuring the total elongation. For example, the parts obtained through the manufacturing process of FR 2 780 984, though having a high tensile strength, have a total elongation which remains lower than 6%.

Thus, it was proposed in EP 2 137 327 a method for manufacturing a press hardened part from a steel blank with a composition containing: 0.040-0.100% C, 0.80-2.00% Mn, <0.30% Si, <0.005% S, <0.030% P, 0.01-0.070% Al, 0.015-0.100% Al, 0.030-0.080% Ti, <0.009% N, <0.100% Cu, Ni, Mo, <0.006% Ca. After press hardening, a tensile strength higher than 500 MPa and a total elongation of at least 15% can be obtained. However, due to the nature of the microstructure, which is equiaxed ferrite, it is not possible to achieve very high tensile strength level.

Besides, the document EP 1 865 086 discloses a steel composition comprising 0.1-0.2% C, 0.05-0.3% Si, 0.8-1.8% Mn, 0.5-1.8% Ni, <0.015% P, <0.003% S, 0.0002-0.008% B, optionally 0.01-0.1% Ti, optionally 0.01-0.05% Al, optionally 0.002-0.005% N. This composition makes it possible to manufacture a press hardened part with a tensile strength higher than 1000 MPa and with a total elongation higher than 10%. However, due to its high nickel content, this steel is costly to manufacture.

The document EP 1 881 083 discloses a press hardened part made from a steel composition containing 0.11-0.18% C, 0.10-0.30% Si, 1.60-2.20% Mn, <0.0015% P, <0.010% S, 1.00-2.00% Cr, 0.020% N, 0.020-0.060% Nb, 0.001-0.004% B, 0.001-0.050% Ti. The part has a tensile strength higher than 1200 MPa and a total elongation of more than 12%. However, due to its high chromium content, this steel is also costly to manufacture Most of all, the total elongation does in fact not appear to be the most relevant parameter to guarantee that the part has sufficient ductility to absorb deformations or impacts without risk of rupture. Thus, a high total elongation does not guarantee such sufficient ductility.

Rather, as analyzed in the publication "Crash Ductility and Numerical Modeling of Usibor® 1500 Fracture behavior", P. Dietsch and D. Hasenpouth, Proceedings of the International Automotive Body Congress, Frankfurt 2015, the fracture strain and the bending angle appear to be more relevant than the total elongation to guarantee that the part has sufficient ductility to absorb deformations or impacts without risk of rupture, in particular in the areas corresponding to local stress concentrations due to the geometry of the part or to the potential presence of micro-defects on the surface of the parts. This ductility may also be referred to as "crash ductility", and is not correlated with the total and uniform elongations.

The document WO 2017/006159 discloses a process for manufacturing a press hardened part from a steel having a composition comprising 0.062-0.095% C, 1.4-1.9% Mn, 0.2-0.5% Si, 0.020-0.070% Al, 0.02-0.1% Cr, wherein 1.5%≤C+Mn+Si+Cr≤2.7%, 0.040-0.060% Nb, 3.4*N≤Ti≤8*N, 0.044≤Nb+Ti≤0.090%, 0.0005-0.004% B, 0.001-0.009% N, 0.0005-0.003% S and 0.001-0.20% P, the press hardened part having a bending angle higher than 75° and a fracture strain under plane strain condition higher than 0.60.

However, the tensile strength of such parts remains lower than 1200 MPa.

Thus, it is desired to have a steel sheet for manufacturing a press hardened part, a press hardened part and a manufacturing process thereof that would not have the previous limitations. It is more particularly desired to have a steel sheet suitable for producing a press hardened steel part having a yield strength YS of at least 1000 MPa, a tensile strength TS comprised between 1300 and 1600 MPa, and a high ductility characterized by a bending angle higher than 60° and a fracture strain under plain strain condition higher than 0.50, and such a press hardened steel part. It is also desired to have a steel sheet for press hardening that could be available either in uncoated state or with a metallic coating providing to the steel sheet a high corrosion resistance after press hardening.

Besides, it is desirable produce a steel sheet or press hardened steel part that is easily weldable, either before or after hot press forming.

It is especially desirable to have a steel sheet that could be easily weldable either in a homogeneous process (i.e. welding of two sheets with the same composition) or in heterogeneous process (welding of two sheets with different steel compositions) and further press hardened, such that these press hardened welds have high mechanical properties.

In order to improve their resistance to oxidation, sheets made of press hardenable steels are usually coated with a pre-coating, in particular an aluminum, aluminum-based alloy or aluminum alloy pre-coating. Blanks produced from such pre-coated sheets can be welded to other blanks, for example other pre-coated blanks, these welded blanks being then hot-formed and press hardened to their final shape.

When such pre-coated blanks are being welded to other blanks, a part of the pre-coating is molten into the weld metal created between those blanks by welding.

This exogenous metal can result in the formation of intermetallic areas, which, on subsequent mechanical loading, tend to be the site of fracture initiation under static or dynamic conditions.

Moreover, since aluminum is an alphageneous element, it delays the transformation into austenite of the molten area during the heating preceding the hot forming of the welded blank. Therefore, in this case, it is not possible to obtain a weld joint having a completely quenched structure after press-hardening, and the thus obtained weld joint therefore has lower hardness and tensile strength than the sheets themselves.

To solve this problem, it was proposed to remove the pre-coating in the area of the weld through laser ablation prior to welding.

However, this laser ablation induces supplementary costs.

Therefore, it is also desirable to have a steel sheet pre-coated with an aluminum, aluminum-based alloy or aluminum alloy pre-coating, which can be laser welded to another sheet without removing all the pre-coating whilst guaranteeing high mechanical properties throughout the whole press hardened laser welded steel part after press forming, in particular high mechanical properties in the laser weld.

It is also desirable to have press hardened parts which would be easily weldable after hot press forming, especially by resistance spot welding.

Indeed, the thermal cycle associated to the resistance spot welding induces a temperature gradient ranging from room temperature up to steel liquidus. Heating at temperature in the range of Ac1-Ac3 may cause a softening of the microstructure of the press hardened part in the Heat Affected Zone, i.e. the areas of the press-hardened parts which are not melted and have their microstructure and properties altered by welding. When this softening is too important, an external applied stress can be concentrated in the softened zone, thus causing a premature failure by strain concentration.

Therefore, it is desirable to have resistance spot welded joints with high ductility and preferably free from significant softening in the Heat Affected Zone.

SUMMARY OF THE INVENTION

The present invention relates to a steel sheet for the manufacture of a press hardened steel part, the steel sheet having a composition comprising, by weight percent:

$0.15\% \leq C \leq 0.22\%$
$3.5\% \leq Mn < 4.2\%$
$0.001\% \leq Si \leq 1.5\%$
$0.020\% \leq Al \leq 0.9\%$
$0.001\% \leq Cr \leq 1\%$
$0.001\% \leq Mo \leq 0.3\%$
$0.001\% \leq Ti \leq 0.040\%$
$0.0003\% \leq B \leq 0.004\%$
$0.001\% \leq Nb \leq 0.060\%$
$0.001\% \leq N \leq 0.009\%$
$0.0005\% \leq S \leq 0.003\%$
$0.001\% \leq P \leq 0.020\%$
optionally $0.0001\% \leq Ca \leq 0.003\%$,
the remainder being iron and unavoidable impurities, said steel sheet having a microstructure consisting of, in surface fraction:
less than 50% of ferrite,
between 1% and 20% of retained austenite,
cementite, such that the surface density of cementite particles larger than 60 nm is lower than $10^7/mm^2$,
a complement consisting of bainite and/or martensite,
the retained austenite having an average Mn content of at least 1.1*Mn %, wherein Mn % designates the Mn content in the steel composition.

According to an embodiment, the steel sheet comprises a metallic pre-coating on each of its two main faces.

For example, the metallic pre-coating is an aluminum, an aluminum-based alloy or an aluminum alloy pre-coating.

According to another example, the metallic pre-coating is a zinc aluminum, a zinc-based alloy or a zinc alloy pre-coating.

Preferably, the steel sheet comprises a decarburized area on the surface of each of the two main surfaces under the metallic pre-coating, the depth $p_{50\%}$ of this decarburized area being comprised between 6 and 30 micrometers, $p_{50\%}$ being the depth, at which the carbon content is equal to 50% of the C content in the steel composition, and wherein the annealed steel sheet does not contain a layer of iron oxide at the interface between said main surfaces and said metallic pre-coating.

According to an embodiment, the steel sheet is an unannealed steel sheet, the microstructure of the steel sheet consisting of, in surface fraction:
between 5% and 20% of retained austenite,
cementite, such that the surface density of cementite particles larger than 60 nm is lower than $10^7/mm^2$,
the complement consisting of bainite and/or martensite,
the retained austenite having an average Mn content of at least 1.1*Mn %, wherein Mn % designates the Mn content in the steel composition.

Especially, the steel sheet is for example a hot-rolled steel sheet having a specific Charpy energy KCv higher than or equal to 60 J/cm².

According to another embodiment, the steel sheet is an annealed steel sheet, the microstructure of the annealed steel sheet consisting of, in surface fraction:
less than 50% of ferrite,
between 1% and 20% of retained austenite,
cementite, such that the surface density of cementite particles larger than 60 nm is lower than $10^7/mm^2$,
the complement consisting of martensite,
the retained austenite having an average Mn content of at least 1.1*Mn %, wherein Mn % designates the Mn content in the steel composition.

Preferably, the composition of the steel is such that Al≥0.3%.

The steel sheet generally has a thickness comprised between 0.7 mm and 5 mm.

According to an embodiment, the Mn content is lower than 4.0%.

The Mo content is preferably of at least 0.05%.

In an embodiment, the B content is lower than or equal to 0.0015%.

In an embodiment, the composition is such that Al≥0.15% and Ti<3.42*N.

In another embodiment, the composition is such that Al<0.15% and Ti≥3.42*N. In this embodiment, the composition is preferably such that Ti<8×N.

Preferably, the Nb content is higher than or equal to 0.010%.

Preferably, the nitrogen content is lower than 0.007%.

The invention also relates to a method for producing a steel sheet for the manufacture of a press hardened steel part, said method comprising the following successive steps:

providing a steel semi-product having a composition comprising, by weight percent:
0.15%≤C≤0.22%
3.5%≤Mn<4.2%
0.001%≤Si≤1.5%
0.020%≤Al≤0.9%
0.001%≤Cr≤1%
0.001%≤Mo≤0.3%
0.001%≤Ti≤0.040%
0.0003%≤B≤0.004%
0.001%≤Nb≤0.060%
0.001%≤N≤0.009%
0.0005%≤S≤0.003%
0.001%≤P≤0.020%
optionally 0.0001%≤Ca≤0.003%,
the remainder being iron and unavoidable impurities,
hot-rolling said steel semi-product to obtain a hot-rolled steel sheet,
coiling said hot-rolled steel sheet at a coiling temperature $T_{coil}$ lower than 550° C., to obtain a coiled steel sheet,
optionally cold-rolling the coiled steel sheet.

For example, when the cold-rolling is performed, the coiled steel sheet is cold-rolled with a cold-rolling ratio comprised between 30% and 80%.

Preferably, after coiling and before cold-rolling, the coiled steel sheet is batch annealed at a batch annealing temperature $T_{HBA}$ comprised between 550° C. and 700° C., the coiled steel sheet being maintained at said batch annealing temperature $T_{HBA}$ for a batch annealing time $t_{HBA}$ comprised between 1 hour and 20 hours.

Preferably, the method further comprising a step of annealing the coiled and optionally cold-rolled steel sheet at an annealing temperature $T_A$ higher than or equal to 650° C., the annealing step comprising heating the coiled and optionally cold-rolled steel sheet to the annealing temperature $T_A$, and holding the coiled and optionally cold-rolled steel sheet at the annealing temperature $T_A$ for an annealing time $t_A$ comprised between 30 s and 600 s.

In an embodiment, the annealing temperature $T_A$ is lower than Ae3.

In another embodiment, the annealing temperature $T_A$ is higher than or equal to Ae3.

According to an embodiment, after the holding at the annealing temperature $T_A$, the steel sheet is pre-coated with metal or a metal alloy by hot-dip coating in a bath, then cooled down to room temperature.

For example, the steel sheet is pre-coated with zinc, a zinc-based alloy or a zinc alloy.

In another example, the steel sheet is pre-coated with aluminum, an aluminum-based alloy or an aluminum alloy.

Preferably, the steel sheet is annealed at said annealing temperature $T_A$ to obtain, upon completion of the annealing, a decarburization of the surface of the annealed steel sheet over a depth $p_{50\%}$ comprised between 6 and 30 micrometers, whereby $p_{50\%}$ is the depth at which the carbon content is equal to 50% of the C content in the composition, and to obtain an annealed steel sheet having no iron oxide layer on its surface.

Generally, the steel sheet has a thickness comprised between 0.7 mm and 5 mm.

Preferably, the composition of the steel is such that Al≤0.3%.

According to an embodiment, the Mn content is lower than 4.0%.

The Mo content is preferably of at least 0.05%.

In an embodiment, the B content is lower than or equal to 0.0015%.

In an embodiment, the composition is such that Al≥0.15% and Ti<3.42*N.

In another embodiment, the composition is such that Al<0.15% and Ti≥3.42*N. In this embodiment, the composition is preferably such that Ti<8×N.

Preferably, the Nb content is higher than or equal to 0.010%.

Preferably, the nitrogen content is lower than 0.007%.

The invention also relates to a press hardened steel part, made of a steel having a composition comprising, by weight percent:
0.15%≤C≤0.22%
3.5%≤Mn<4.2%
0.001%≤Si≤1.5%
0.020%≤Al≤0.9%
0.001%≤Cr≤1%
0.001%≤Mo≤0.3%
0.001%≤Ti≤0.040%
0.0003%≤B≤0.004%
0.001%≤Nb≤0.060%
0.001%≤N≤0.009%
0.0005%≤S≤0.003%
0.001%≤P≤0.020%
optionally 0.0001%≤Ca≤0.003%,
the remainder being iron and unavoidable impurities,
wherein the microstructure consists of, in the majority of said press hardened steel part, in surface fraction:
at least 50% of partitioned martensite,
less than 30% of ferrite,
at least 2% of retained austenite,
cementite such that the surface density of cementite particles larger than 60 nm is lower than $10^7/mm^2$, and
at most 5% of fresh martensite,
the retained austenite having an average C content of at least 0.5%.

Generally, the retained austenite has an average Mn content of at least 1.1*Mn %, wherein Mn % designates the Mn content in the steel composition.

Preferably, the composition of the steel is such that Al≥0.3%.

According to an embodiment, the press hardened steel part is coated with a metallic coating.

For example, said metallic coating is a zinc-based alloy, or a zinc alloy coating.

In another example, said metallic coating is an aluminum-based alloy, or an aluminum alloy coating.

The press hardened steel part generally has a yield strength of at least 1000 MPa, a tensile strength comprised between 1300 and 1600 MPa, a fracture strain under plain strain condition higher than 0.50 and a bending angle higher than 60°.

According to an embodiment, the press hardened steel part comprises at least one first hot deformed zone with an equivalent deformation $\varepsilon_b$ higher than 0.15, and at least one second zone having experienced the same cooling cycle in press hardening than the first hot deformed zone, wherein the equivalent deformation $\varepsilon_b$ is less than 0.05.

Generally, the difference in hardness between said second zone and said first hot deformed zone is more than 15 HV1.

Generally, the average martensitic lath width in said first hot deformed zone is reduced of more than 15% as compared to the average martensitic lath width in said second zone.

Preferably, the proportion of martensitic lath having a width lower than 0.8 μm is at least 35% higher in the highly deformed zones than in the little deformed zones.

Generally, the press hardened steel part has a thickness comprised between 0.7 mm and 5 mm.

According to an embodiment, the Mn content is lower than 4.0%.

The Mo content is preferably of at least 0.05%.

In an embodiment, the B content is lower than or equal to 0.0015%.

In an embodiment, the composition is such that Al≥0.15% and Ti<3.42*N.

In another embodiment, the composition is such that Al<0.15% and Ti≥3.42*N. In this embodiment, the composition is preferably such that Ti<8×N.

Preferably, the Nb content is higher than or equal to 0.010%.

Preferably, the nitrogen content is lower than 0.007%.

The invention further relates to a process for manufacturing a press hardened steel part, comprising the following successive steps:

providing a steel sheet according to the invention or produced by a method according to the invention, cutting said steel sheet to a predetermined shape, so as to obtain a steel blank, heating the steel blank to a temperature $T_m$ comprised between 800° C. and 950° C. and holding the steel blank at said temperature $T_m$ for a holding time $t_m$ comprised between 60 s and 600 s, so as to obtain a heated steel blank having a structure comprising between 70% and 100% of austenite, transferring the heated blank to a forming press, hot-forming the heated blank in the forming press so as to obtain a formed part, cooling the formed part to a cooling stop temperature $T_C$ comprised between room temperature and Ms-100° C., reheating the formed part from the cooling stop temperature $T_C$ to a post treatment temperature $T_{PT}$ comprised between 350° C. and 550° C., and maintaining the formed part at said post treatment temperature $T_{PT}$ for a holding time $t_{PT}$ comprised between 10 s and 600 s, cooling the formed part to room temperature to obtain the press hardened steel part.

Generally, the press hardened steel part has a thickness comprised between 0.7 mm and 5 mm.

The invention further relates to a laser welded steel blank for the manufacture of a press hardened laser welded steel part, the laser welded steel blank comprising:

a first steel blank produced by cutting a steel sheet according to the invention, comprises a metallic pre-coating on each of its two main faces, the metallic pre-coating being an aluminum, an aluminum-based alloy or an aluminum alloy pre-coating, a second steel blank having a composition comprising between 0.065% and 0.38% of carbon, said second steel blank being pre-coated with an aluminum, an aluminum-based alloy or an aluminum alloy pre-coating, and a laser weld joining the first blank to the second steel blank wherein the aluminum, aluminum-based alloy or aluminum alloy pre-coatings of the first steel blank and of the second steel blank cover the immediate vicinity of the laser weld on at least one side of the first and second steel blanks.

In another embodiment, the second steel blank is made of a steel having a chemical composition comprising, by weight percent: 0.04%≤C≤0.38%, 0.05%≤Mn≤4.2%, 0.001%≤Si≤1.5%, 0.005%≤Al≤0.9%, 0.001%≤Cr≤2%, Mo≤0.65%, Ni≤2%, 0.001%≤Ti≤0.2%, Nb≤0.1%, B≤0.010%, 0.0005%≤N≤0.010%, 0.0001%≤S≤0.05%, 0.0001%≤P≤0.1%, W≤0.30%, Ca≤0.006%, the remainder being iron and unavoidable impurities.

Preferably, the composition of the second steel blank is such that C≥0.065%.

The invention also relates to a method for manufacturing a laser welded steel blank comprising:

providing a first steel sheet according to the invention, comprises a metallic pre-coating on each of its two main faces, the metallic pre-coating being an aluminum, an aluminum-based alloy or an aluminum alloy pre-coating, cutting the first steel sheet to a predetermined shape, so as to obtain a first steel blank, providing a second steel blank having a composition comprising between 0.065% and 0.38% of carbon, pre-coated with an aluminum, an aluminum-based alloy or an aluminum alloy pre-coating, without removing all the pre-coating on at least one side of the first and second steel blanks, laser welding the first steel blank to the second steel blank so as to obtain the laser welded steel blank.

In another embodiment, the second steel blank is made of a steel having a chemical composition comprising, by weight percent: 0.04%≤C≤0.38%, 0.05%≤Mn≤4.2%, 0.001%≤Si≤1.5%, 0.005%≤Al≤0.9%, 0.001%≤Cr≤2%, Mo≤0.65%, Ni≤2%, 0.001%≤Ti≤0.2%, Nb≤0.1%, B≤0.010%, 0.0005%≤N≤0.010%, 0.0001%≤S≤0.05%, 0.0001%≤P≤0.1%, W≤0.30%, Ca≤0.006%, the remainder being iron and unavoidable impurities. Preferably, the composition of the second steel blank is such that C≥0.065%.

The invention further relates to a press hardened laser welded steel part, comprising a first press hardened steel part, a second press hardened steel part and a press hardened laser weld joining the first press hardened steel part to the second press hardened steel part, wherein the first press hardened steel part is a part according to the invention, the part being coated with a metallic coating, said metallic coating is an aluminum-based alloy, or an aluminum alloy coating, the second press hardened steel part has a composition comprising between 0.04% and 0.38% of carbon, said second press hardened steel part being coated with an aluminum, an aluminum-based alloy or an aluminum alloy coating, said press hardened laser weld having a structure comprising at most 15% of ferrite, and wherein on at least one side of the first and second press hardened steel parts, the thickness of the coating in the Heat Affected Zone is the same as the thickness of the coating in the rest of the first and second press hardened steel parts.

Preferably, the second press hardened steel part has a composition comprising between 0.065% and 0.38% of carbon.

In another embodiment, the second press hardened steel part is made of a steel having a chemical composition comprising, by weight percent: 0.04%≤C≤0.38%, 0.05%≤Mn≤4.2%, 0.001%≤Si≤1.5%, 0.005%≤Al≤0.9%, 0.001%≤Cr≤2%, Mo≤0.65%, Ni≤2%, 0.001%≤Ti≤0.2%, Nb≤0.1%, B≤0.010%, 0.0005%≤N≤0.010%, 0.0001%≤S≤0.05%, 0.0001%≤P≤0.1%, W≤0.30%, Ca≤0.006%, the remainder being iron and unavoidable impurities. Preferably, the C content is at least 0.065%.

The invention also relates to a process for manufacturing a press hardened laser welded steel part, comprising the following successive steps:

providing a laser welded steel blank according to the invention or produced by a method according to the invention, heating the laser welded steel blank to a temperature $T_m$ comprised between 800° C. and 950° C. and holding the laser welded steel blank at said temperature $T_m$ for a holding time $t_m$ comprised between 60 s and 600 s, so as to obtain a heated laser welded steel blank having a structure comprising between 70% and 100% of austenite, transferring the heated laser welded steel blank to a forming press, hot-forming the heated laser welded blank in the forming press so as to obtain a formed laser welded part, cooling the formed laser welded part to a cooling stop temperature $T_C$ comprised between room temperature and Ms-100° C., reheating the formed laser welded part from the cooling stop temperature $T_C$ to a post treatment temperature $T_{PT}$ comprised between 350° C. and 550° C., and maintaining the formed laser welded part at said post treatment temperature $T_{PT}$ for a holding time $t_{PT}$ comprised between 10 s and 600 s, cooling the formed laser welded part to room temperature to obtain the press hardened laser welded steel part.

The invention also relates to a resistance spot weld of at least a first and a second steel parts, wherein the first steel part is a press hardened steel part according to the invention, said resistance spot weld having an alpha value of at least 50 daN/mm² and a plug ratio of at least 0.70.

For example, the second steel part is also a press-hardened steel part according to the invention.

Preferably, the first steel part has a composition such that Al≥0.3%, and the difference between the Vickers hardness of the base steel of the first steel part and the minimum Vickers hardness value in the Heat Affected Zone is lower than 25% of the Vickers hardness of the base steel of the first press hardened steel part.

The invention further relates to a welded assembly comprising a first steel part and a second steel part welded together by resistance spot welding, the welded assembly comprising at least one resistance spot weld joining the first steel part to the second steel part, wherein the first steel part is a press hardened steel part according to the invention, the second steel part is made of a steel having a chemical composition comprising, by weight percent: 0.04%≤C≤0.38%, 0.05%≤Mn≤4.2%, 0.001%≤Si≤1.5%, 0.005%≤Al≤0.9%, 0.001≤% Cr≤2%, Mo≤0.65%, Ni≤2%, 0.001%≤Ti≤0.2%, Nb≤0.1%, B≤0.010%, 0.0005%≤N≤0.010%, 0.0001%≤S≤0.05%, 0.0001%≤P≤0.1%, W≤0.30%, Ca≤0.006%, the remainder being iron and unavoidable impurities, said or each resistance spot weld having an alpha value of at least 50 daN/mm² and a plug ratio of at least 0.70.

Preferably, the second steel part has a composition such that C≥0.065%.

Preferably, the first steel part has a composition such that Al≥0.3%, and the difference between the Vickers hardness of the base steel of the first steel part and the minimum Vickers hardness value in the Heat Affected Zone is lower than 25% of the Vickers hardness of the base steel of the first press-hardened part.

The second steel part has for example a composition according to the invention.

For example, the second steel part has a composition such that Al≥0.3%.

Generally, the second steel part is a press hardened steel part.

The invention also relates to a welded assembly comprising a first steel part and a second steel part welded together by resistance spot welding, the welded assembly comprising at least one resistance spot weld joining the first steel part to the second steel part, wherein the first steel part is a press hardened steel part according to invention, and the second steel part is a press hardened part, or a cold stamped or cold formed steel part, with a tensile strength not higher than 2100 MPa.

Preferably, the second steel part has a C content not higher than 0.38% and a Mn content not higher than 4.2%.

The invention also relates to the use of a press hardened steel part according to any the invention, or produced by a method according to the invention, for the manufacture of an anti-intrusion part or an energy absorption part of an automotive vehicle.

BRIEF DESCRIPTION OF THE DRAWINGS

The invention will now be described in more details but without limitations in view of the appended FIGURE.

The FIGURE illustrates the microstructure of a press hardened part according to an embodiment of the invention.

DETAILED DESCRIPTION

The steel sheet and the press hardened steel part are manufactured from a steel having a specific composition, the elements being expressed in weight percentage:

0.15%≤C≤0.22%: the carbon content must be not lower than 0.15% for obtaining satisfactory yield strength and tensile strength after press hardening. However, when the carbon content exceeds 0.22%, the bendability and the weld toughness are reduced.

3.5%≤Mn≤4.2%: the manganese content must be of at least 3.5% for having a sufficient hardenability, so as to obtain a structure with a sufficient martensite fraction after press hardening. In addition, below 3.5% of Mn, a too high fraction of ferrite would form upon welding in the Heat Affected Zone, resulting in an insufficient hardness of the Heat Affected Zone and a localization of a fracture in this zone causing a low ductility. However, a Mn content higher than 4.2% increases the risk of the formation of segregations with band-type microstructures, associated with ductility decrease. In addition, a Mn content higher than 4.2% would impair the weldability, especially reduce the tensile properties of resistance spot welds.

Preferably, the Mn content is lower than 4.0% for achieving an even higher weldability.

0.001%≤Si≤1.5%: silicon contributes to steel deoxidation in the liquid stage and may contribute to hardening after hot forming. However, if the Si content is higher than 1.5%, the toughness of the steel sheet after hot-rolling and/or before cold-rolling is insufficient. In addition, such high Si content can cause the formation of surface oxides that prevent the adherence of the coating in the manufacturing of metallic coated steel sheets. Decreasing Si at extremely low value, under 0.001% would be costly and ineffective in view of the properties which are sought after.

0.020%≤Al≤0.9%: when added in quantity not less than 0.020%, aluminum is a very effective deoxidizer in the liquid state. Preferably, the Al content is of at least 0.3%. Especially, if the press hardened part is obtained from a steel sheet pre-coated with an aluminum, an aluminum-based alloy or an aluminum alloy pre-coating, an alloying of this pre-coating is generally performed before hot forming. This alloying requires a heating temperature, before the hot-press forming, comprised between 800° C. and 950° C. Owing to the addition of at least 0.3% of Al, the heating temperature comprised between 800° C. and 950° C. will lead to the desired structure upon heating, comprising at least 70% of austenite, without however leading to a too important coarsening of the austenitic grains.

0.001%≤Cr≤1%: Chromium may be added to delay the dissolution of carbides and stabilize the retained austenite. A maximum of 1% of chromium is allowed: above this content, Cr prevents the dissolution of carbides formed at an early stage. Decreasing Cr at extremely low value, under 0.001% would be costly and ineffective in view of the properties which are sought after.

0.001%≤Mo≤0.3%. Molybdenum contributes to achieving a good weldability, increases the toughness of the hot-rolled steel sheet and thus improves the processability of the hot-rolled steel sheet. Mo also reduces the microsegregations of manganese during the casting. Moreover, Mo increases the tensile strength and the bending angle of the press hardened part. In order to obtain these effects, the Mo content is preferably of at least 0.05%. However, above 0.3%, the addition of Mo is costly. Besides, decreasing Mo at extremely low value, under 0.001% would be costly and ineffective in view of the properties which are sought after.

0.0003%≤B≤0.004%: in a content of at least 0.0003%, boron increases the tensile strength and the bending angle of the press hardened part B. In addition, B increases the toughness of the hot-rolled steel sheet, and therefore increases its processability. Especially, owing to B, up to 1.5% of Si can be present in the steel composition whilst retaining a satisfactory toughness of the hot-rolled steel sheet. B also improves the weldability of the press hardened part. In the present invention, B is however not added for its role on quenchability, since a sufficient quenchability is achieved through the addition of at least 3.5% of Mn. The B content is limited to 0.004%, because above this content, its effect is saturated. In addition, the B content is preferably lower than or equal to 0.0015%, so as to limit the precipitation of borocarbides during the heating and holding preceding the press forming step.

0.001%≤Ti≤0.040%: titanium precipitates at high temperature under the form of nitrides. Thus, titanium may be added to stably bind a sufficient quantity of nitrogen, so that nitrogen is not available, or available only in a small quantity, to combine with boron. Thus, boron is available for increasing the toughness of the hot-rolled steel sheet and the weldability, the tensile strength and the bending angle of the press hardened part. However, when titanium exceeds 0.040%, there is a risk that titanium precipitates at the liquid stage during steel elaboration, thus creating coarse titanium nitrides that lower ductility and bendability after press hardening.

When the steel composition comprises at least 0.15% of Al, the addition of Ti is only optional, since Al, as Ti, binds with nitrogen. However, decreasing Ti at extremely low value, under 0.001% would be costly and ineffective in view of the properties which are sought after. In this embodiment, the Ti content is for example lower than 3.42*N.

When the steel composition comprises less than 0.15% of Al, Ti is preferably added in a content higher than or equal to 3.42*N, wherein N designates the nitrogen content in the steel composition.

Preferably, the Ti content is lower than 8×N.

0.001%≤Nb<0.060%. Niobium may be present as an impurity, in a content of at least 0.001%. Besides, decreasing Nb at extremely low value, under 0.001% would be costly and ineffective in view of the properties which are sought after. When a voluntary addition of Nb is performed, its content is preferably of at least 0.010%. In combination with carbon and/or nitrogen, niobium forms fine niobium carbonitrides Nb(CN). Nb content not less than 0.010% makes it possible to obtain such precipitates which refine austenite grain size during the heating that precedes immediately the hot press forming. This finer austenite grain results in finer lath structure and increased ductility and toughness. However, content higher than 0.060% causes higher hardness of the hot-rolled sheet that makes more difficult to perform cold-rolling.

0.001%≤N≤0.009%: the nitrogen content is adjusted during steel elaboration. In a content not less than 0.001%, nitrogen combines with titanium and niobium to form nitrides and carbonitrides which limit the coarsening of austenite grain during the heating that precedes immediately the hot press forming, which in turn refines the martensitic laths obtained after hot press forming. However, a N content higher than 0.009% lowers the bending angle of the press hardened part and reduces the ductility. Preferably, the nitrogen content is lower than 0.007%.

0.0005%≤S≤0.003%: above 0.003%, sulfides are created which lower bendability and ductility of the press hardened part. However, a S content lower than 0.0005% needs costly desulfurization treatment, without significant benefit. Thus, the S content is of at least 0.0005%.

0.001%≤P≤0.020%: when present in quantity higher than 0.020%, phosphorus can segregate at the austenite grain boundaries and reduce the toughness of the press hardened part. However, a P content lower than 0.001% needs costly treatment at the liquid stage, without significant benefit on the mechanical properties of the press hardened part. Thus, the P content is of at least 0.001%.

0.0001%≤Ca≤0.003%: as an optional element, calcium can be added to the steel composition. When added in a content not less than 0.0001%, Ca combines with sulfur and oxygen, thus creating oxysulfides that do not exert a detrimental effect on ductility, as in the case of elongated manganese sulfides. Furthermore, these oxysulfides act as nucleants for a fine precipitation of (Ti, Nb)(C,N). This effect is saturated when Ca content is higher than 0.003%.

The remainder of the composition is iron and unavoidable impurities. In this respect, nickel, copper, and vanadium are considered as residual elements which are unavoidable impurities. Therefore, their contents are at most 0.05% Ni, at most 0.03% Cu and at most 0.007% V.

According to the invention, the press hardened part is obtained from a steel sheet having the above composition and a specific microstructure.

The steel sheet according to the invention has a thickness comprised between 0.7 mm and 5 mm.

The steel sheet may be a hot-rolled or a cold-rolled steel sheet, depending on the desired thickness of the final part.

For example, the hot-rolled steel sheets according to the invention have a thickness comprised between 1.5 mm and 5 mm, and the cold-rolled steel sheets have a thickness ranging from 0.7 mm to 2.5 mm.

In a particular embodiment, especially when it is desired to produce a press hardened part with a high weight reduction, the steel sheet of the invention has a thickness which is not uniform but which varies. The difference in thickness between the thickest portion of the sheet and the thinnest portion may reach 50% of the thickness of the thickest portion.

In particular, the sheets with non-uniform thickness can be produced by continuous flexible rolling, i.e. by a process wherein the sheet thickness obtained after rolling is variable in the rolling direction, in relationship with the load which has been applied through the rollers to the sheet during the rolling process.

Besides, the steel sheet according to the invention may be an annealed steel sheet. Especially, if the steel sheet is coated by hot-dip coating in a bath, the steel sheet is an annealed steel sheet, as disclosed in further details below. Besides, if the steel sheet is cold-rolled, an annealing is preferably performed after cold-rolling, whether the sheet is hot-dip coated or not.

The microstructure of the steel sheet according to the invention depends on whether the steel sheet is an annealed steel sheet or a steel sheet not subjected to an annealing after hot-rolling (if the steel sheet is a hot-rolled steel sheet) or after cold-rolling (if the steel sheet is a cold-rolled steel sheet).

However, in any case, the steel sheet (i.e. whether it is an annealed or an unannealed steel sheet) has a microstructure consisting of, in surface fraction:
  less than 50% of ferrite,
  between 1% and 20% of retained austenite,
  cementite, such that the surface density of cementite particles larger than 60 nm is lower than $10^7/mm^2$,
  a complement consisting of bainite and/or martensite,
  the retained austenite having an average Mn content of at least 1.1*Mn %, wherein Mn % designates the Mn content in the steel composition.

By "cementite particles larger than 60 nm", it must be understood that the cementite particles which are considered have a larger dimension higher than 60 nm.

The microstructure of the steel sheet includes between 1% and 20% of austenite which is, at room temperature, retained austenite. The retained austenite is enriched in manganese, the average Mn content in the retained austenite being higher than or equal to 1.1*Mn %, wherein Mn % designates the Mn content in the steel composition. This enrichment in Mn stabilizes the retained austenite.

The microstructure of the steel sheet may comprise ferrite, the surface fraction of ferrite being of at most 50%. In an embodiment, the microstructure of the steel sheet comprises no ferrite.

The complement of the microstructure of the steel sheet consists of bainite and/or martensite, which amount for the rest of the microstructure. More specifically, this complement may consist of martensite, or may consist of martensite and bainite.

Especially, owing to the high Mn content in the steel composition, martensite is formed upon cooling from temperatures above Ae1, without requiring a high cooling rate.

The microstructure of the steel sheet may comprise cementite. However, the surface density of cementite particles having a larger dimension higher than 60 nm is lower than $10^7/mm^2$.

The surface fractions of austenite, martensite and ferrite, and the surface density of cementite particles having a larger dimension higher than 60 nm are determined through the following method: a specimen is cut from the steel sheet, polished and etched with a reagent known per se, so as to reveal the microstructure. The section is afterwards examined through optical or scanning electron microscope. The determination of the surface fraction of each constituent (martensite, ferrite, austenite and cementite) is performed with image analysis through a method known per se.

In a first embodiment, the steel sheet is a hot-rolled or cold-rolled steel sheet, which was not subjected to an annealing after hot-rolling or cold-rolling, if applicable, i.e. an unannealed steel sheet. In this first embodiment, the steel sheet is not hot-dip coated.

In this embodiment, the steel sheet has a microstructure consisting of, in surface fraction:
  between 5% and 20% of retained austenite,
  cementite, such that the surface density of cementite particles having a larger dimension higher than 60 nm is lower than $10^7/mm^2$,
  the complement consisting of bainite and/or martensite,
  the retained austenite having an average Mn content of at least 1.1*Mn %, wherein Mn % designates the Mn content in the steel composition.

In a second embodiment, the steel sheet is an annealed steel sheet, which may be a hot-rolled and annealed steel sheet, or a cold-rolled and annealed steel sheet. The annealed steel sheet according to this embodiment is for example a pre-coated steel sheet, or uncoated.

In this second embodiment, the steel sheet has a microstructure consisting of, in surface fraction:
  less than 50% of ferrite,
  between 1% and 20% of retained austenite,
  cementite, such that the surface density of cementite particles having a larger dimension higher than 60 nm is lower than $10^7/mm^2$,
  the complement consisting of martensite,
  the retained austenite having an average Mn content of at least 1.1*Mn %, wherein Mn % designates the Mn content in the steel composition.

In this embodiment, the structure may comprise no ferrite, depending on the annealing conditions, as explained in further details below.

The steel sheet described above may be uncoated or optionally pre-coated with a metallic pre-coating. The metallic pre-coating may be aluminum, aluminum-based alloy or aluminum alloy. The metallic pre-coating may be also zinc, zinc-based alloy or zinc alloy.

In the following, an aluminum (or zinc) based alloy is an alloy in which Al (or Zn) is the main element in weight percentage of the pre-coating, and an aluminum (or zinc) alloy is an alloy in which the Al (or Zn) content by weight is higher than 50% in the pre-coating.

If the steel sheet is pre-coated, it preferably comprises a decarburized area on the surface of each of its two main surfaces under the pre-coating, the depth $p_{50\%}$ of this decarburized area being comprised between 6 and 30 micrometers, $p_{50\%}$ being the depth at which the carbon content is equal to 50% of the C content in the steel composition.

Furthermore, the steel sheet preferably does not contain a layer of iron oxide at the interface between the main surfaces and the metallic pre-coating.

The microstructure of the press hardened steel part according to the invention will be now described.

This microstructure description applies to the majority of the press hardened steel part, which means as defined herein that this microstructure is present in at least 95% of the volume of the press hardened steel part in order to achieve the desired mechanical properties. As will be explained below, due to the fact that the part can be welded before press hardening, i.e. that the weld microstructure may be different from the bulk of the press hardened part, or due to the microstructural changes that may result from more intense local deformation in the press forming step, the microstructure may be locally different in some zones of the part, which however account for less than 5% of the volume of this part.

Thus, the majority of the press hardened part has a microstructure consisting of, in surface fraction:
- at least 50% of partitioned martensite,
- less than 30% of ferrite,
- at least 2% of retained austenite,
- cementite, such that the surface density of cementite particles having a larger dimension higher than 60 nm is lower than $10^7/mm^2$,
- at most 5% of fresh martensite,
- the retained austenite having an average C content of at least 0.5%.

These surface fractions and density are determined through the following method: a specimen is cut from the press hardened part, polished and etched with a reagent known per se, so as to reveal the microstructure. The section is afterwards examined through optical or scanning electron microscope. The determination of the surface fraction of each constituent (partitioned martensite, fresh martensite, ferrite and austenite) and the determination of the surface density of cementite particles having a larger dimension higher than 60 nm are performed with image analysis through a method known per se. The retained austenite fraction is for example determined by X-ray diffraction (XRD).

Partitioned martensite is present as fine elongated laths, oriented within the prior austenite grains. Partitioned martensite is created upon cooling below the Ms transformation temperature after hot forming, and subsequent heating and holding at a post treatment temperature $T_{PT}$ comprised between 350° C. and 550° C.

The partitioned martensite has an average C content strictly lower than the nominal C content of the steel. This low C content results from the partitioning of carbon from the martensite, created upon quenching below the Ms temperature of the steel, to the austenite, during the holding at a post treatment temperature $T_{PT}$ comprised between 350° C. and 550° C.

Fresh martensite may be present in the structure. Especially, fresh martensite may form upon cooling of the formed part from the post treatment temperature $T_{PT}$ to room temperature. However, owing to the high stabilization of the austenite with C and generally with Mn, the surface fraction of fresh martensite formed upon cooling remains lower than 5%.

Partitioned martensite can be distinguished from fresh martensite on a section polished and etched with a reagent known per se, for example Nital reagent, observed by Scanning Electron Microscopy (SEM) and Electron Backscatter Diffraction (EBSD).

The microstructure of the press hardened part includes at least 2% of austenite which is, at room temperature, retained austenite. The retained austenite is enriched in carbon, this enrichment resulting from partitioning of carbon from the martensite created below Ms to the austenite during the holding at the post treatment temperature $T_{PT}$ comprised between 350° C. and 550° C.

Especially, the retained austenite has an average C content of at least 0.5%. This enrichment in C stabilizes the austenite.

The C content in the retained austenite is for example determined by determining the retained austenite fraction and the lattice parameters by an X-ray diffraction (XRD) analysis, with a Rietveld refinement (Rietveld, H., "A profile refinement method for nuclear and magnetic structures", Journal of applied Crystallography, 2(2), 65-71, 1969). The C content in the retained austenite is then determined by using the Dyson and Holmes formulae (D. J. Dyson, and B. Holmes: "Effect of alloying additions on the lattice parameter austenite", Journal of the Iron and Steel Institute, 1970, 208, 469-474).

The retained austenite is also generally enriched in manganese, and stabilized by this element.

Especially, the retained austenite has an average Mn content generally higher than or equal to 1.1*Mn %, wherein Mn designates the Mn content in the steel composition.

When present in surface fraction of at least 2%, retained austenite contributes to increase ductility, especially the bending angle and the fracture strain.

The microstructure of the parts may also include ferrite. However, this soft and ductile constituent does not make it possible to achieve high tensile strength. Thus, as one object of the invention is to manufacture press hardened part with a tensile strength comprised between 1300 and 1600 MPa, the surface fraction of ferrite must not be higher than 30%, otherwise the desired strength could not be obtained.

The ferrite grains, if any, preferably have an average size of at most 1.5 µm. This average ferritic grain size contributes to achieving a yield strength of at least 1000 MPa.

As the press hardened part must have high bendability properties, it has been found that the average size of titanium nitrides should preferably be controlled to this end. The average size of TiN may be determined through observations by Scanning or Transmission Electron Microscopy observations. More specifically, it has been determined that the average size of TiN should preferably be limited in the outer zones near the surface of the press hardened part, which are the most strained zones during bending. These zones are comprised between one quarter thickness of the part, and the closest surface of the part. If the average size of TiN is not less than 2 micrometers, damage is initiated at the boundaries between the rectangular-shaped titanium nitrides and the matrix, and the bending angle may be less than 60°.

In these outer zones, there is also a risk that damage initiation results from the presence of elongated sulfides: these constituents can be present when sulfur content is sufficiently high to combine, mainly with manganese, under the form of coarse precipitates. As their plasticity is high at elevated temperatures, they are easily elongated by hot rolling and during hot deformation in press hardening. Thus, when the average length of sulfides is higher than 120 micrometers in the outer zones (i.e. from one quarter thickness to the closest surface), the fracture strain can be less than 0.50 due to ductile initiation on these sulfides.

This press hardened part may be uncoated or optionally coated. The coating may be aluminum-based alloy or aluminum alloy. The coating may be also zinc-based alloy or zinc alloy.

In a particular embodiment, the press hardened steel part of the invention has a thickness which is not uniform but which varies. The difference in thickness between the thickest portion of the part and the thinnest portion of the part may reach 50% of the thickness of the thickest portion.

Thus, it is possible to achieve the desired mechanical resistance level in the zones which are the most subjected to external stresses, and to save weight in the other zones of the press hardened part, thus contributing to the vehicle weight reduction. In particular, the parts with non-uniform thickness can be produced from sheets having a variable thickness, manufactured by continuous flexible rolling. Thus, within the conditions of the invention, it is possible to manufacture advantageously vehicle parts with varying thickness such as front and rear rails, seat cross members, tunnel arches, pillars, dash panel cross members, or door rings.

Such a press hardened part having a varying thickness is especially produced from a steel sheet according to the invention having a varying thickness.

The process for manufacturing the steel sheet and the press hardened part will be now explained.

A semi-product in the form of cast slab or ingot, able to be further hot-rolled is provided with the steel composition described above. The thickness of this semi-product is typically comprised between 50 and 250 mm.

This semi-product is heated to a temperature preferably comprised between 1200 and 1300° C., hot-rolled so as to obtain a hot-rolled steel sheet, and coiled at a temperature $T_{coil}$.

The coiling temperature $T_{coil}$ must not be higher than 550° C., otherwise a too important precipitation of niobium carbonitrides occurs, which induces hardening and increases difficulties for the further cold rolling step. When $T_{coil}$ does not exceed 550° C., at least 50% of free niobium remains in the steel sheet. In addition, the coiling temperature is limited to 550° C. to limit internal selective oxidation.

The coiling temperature is preferably of at least 20° C., still preferably of at least 350° C.

During the coiling, the manganese partitions to the austenite, thus enriching and stabilizing the austenite.

At this stage, the thickness of the hot rolled steel sheet may be in the typical range of 1.5-5 mm.

The hot-rolled steel sheet thus obtained has a microstructure consisting of, in surface fraction:

between 5% and 20% of retained austenite, cementite, such that the surface density of cementite particles having a larger dimension higher than 60 nm is lower than $10^7/mm^2$, the complement consisting of bainite and/or martensite, the retained austenite having an average Mn content of at least 1.1*Mn %, wherein Mn % designates the Mn content in the steel composition.

At this stage, the hot-rolled steel sheet has a very high Charpy energy, generally higher than 60 J/cm² at 25° C.

For applications wherein the desired final thickness is within this range, the hot-rolled steel sheets may be used as such for manufacturing a press hardened part, as described below, or annealed and coated with the process described below if a coated press hardened part is to be manufactured.

For applications wherein a lower thickness is desired, especially in the range of 0.7-2.5 mm, the hot-rolled steel sheet is pickled in usual conditions and further cold rolled.

In order to obtain a high fraction of recrystallization during the further annealing, the cold rolling ratio is typically comprised between 30% and 80%.

The cold rolling ratio is defined in the following manner: if $t_0$ designates the thickness of the steel sheet before cold rolling, and $t_f$ the thickness of the steel sheet after cold rolling, the rolling ratio is: $(t_0-t_f)/t_0$.

At this stage, i.e. just after the cold-rolling, the cold-rolled steel sheet has a microstructure consisting of, in surface fraction:

between 5% and 20% of retained austenite, cementite, such that the surface density of cementite particles having a larger dimension higher than 60 nm is lower than $10^7/mm^2$, the complement consisting of bainite and martensite, the retained austenite having an average Mn content of at least 1.1*Mn %, wherein Mn % designates the Mn content in the steel composition.

Preferably, after hot-rolling and before cold-rolling, the hot-rolled steel sheet is batch annealed in order to reduce the hardness of the hot-rolled steel sheet and therefore improve its cold-rollability and to reduce the risks of edge cracking during the further cold-rolling.

For example, the hot-rolled steel sheet is batch annealed at a batch annealing temperature $T_{HBA}$ comprised between 550° C. and 700° C., and held at this temperature for a batch annealing time $t_{HBA}$ comprised between 1 hour and 20 hours.

After hot-rolling (if a hot-rolled and pre-coated steel sheet is to be produced), or after cold-rolling, the rolled steel sheet, i.e. the hot rolled or cold rolled steel sheet, is then optionally annealed.

The annealing is preferably performed if the rolled steel sheet is a cold-rolled steel sheet, after the cold-rolling. Indeed, the annealing is performed in such case in order to achieve recrystallization of the grains. Especially, owing to this recrystallization, the flatness of the steel sheets after annealing is especially good, which makes it possible to produce sheets or blanks that can be welded by laser welding. Indeed, laser welding requests blanks with strict flatness tolerances, otherwise geometrical defects can occur in welding due to gaps.

If the rolled steel sheet is a hot-rolled steel sheet, no such recrystallization is needed, and the hot-rolled steel sheet is cut to produce a blank and hot formed as described below without any annealing.

However, if it is desired to produce a hot-rolled or cold-rolled steel sheet coated by hot-dipping in a bath, the hot-rolled or cold-rolled steel sheet is in any case annealed after the coiling in preparation for the coating.

In other words, the annealing is optionally performed if an uncoated hot-rolled or cold-rolled steel sheet is to be produced.

By contrast, the annealing, whether the steel sheet is hot-rolled or cold-rolled, is in any case performed if a hot-dip coated steel sheet is to be produced.

In any case (i.e. whether the sheet is a hot-rolled sheet or a cold-rolled sheet), the annealing is performed by heating the steel sheet to an annealing temperature $T_A$ higher than or equal to 650° C., holding the steel sheet at the annealing temperature $T_A$ for an annealing time $t_A$ comprised between 30 s and 600 s, then cooling the steel sheet in order to obtain an annealed steel sheet having a structure consisting of, in surface fraction less than 50% of ferrite, between 1% and 20% of retained austenite, the retained austenite having an average Mn content higher than or equal to 1.1*Mn %, cementite, such that the surface density of cementite particles having a larger dimension higher than 60 nm is lower than $10^7/mm^2$, the complement consisting of martensite.

The steel sheet may be cooled directly from the annealing temperature $T_A$ to room temperature, or may be subjected, during the cooling, to a tempering treatment and/or to a hot-dip coating in a bath, as explained in further details below.

According to an embodiment, the steel sheet being generally a cold-rolled steel sheet, the annealing temperature $T_A$ is higher than Ae3, so as to achieve a full recrystallization. Ae3 designates the equilibrium transformation temperature, above which austenite is completely stable.

In this embodiment, the structure of the steel sheet, after cooling down to room temperature, does not comprise ferrite but comprises a high fraction of fresh martensite, with a high hardness.

Therefore, in this embodiment, the steel sheet is preferably subjected to a tempering treatment after the annealing to facilitate the further cutting of the sheet to obtain a blank.

The tempering treatment is for example performed after the holding at the annealing temperature $T_A$, and before an optional hot-dip coating.

For example, this tempering treatment is performed by cooling the steel sheet from the annealing temperature $T_A$, after the holding for the annealing time $t_A$, to a temperature comprised between room temperature and Ms-100° C., then reheating the steel sheet to a tempering temperature Tt comprised between 350° C. and 550° C. and holding at this temperature for a time comprised between 10 s and 600 s. Ms designates the temperature at which transformation to martensite starts upon cooling.

After the holding at the tempering temperature Tt, the steel sheet is then either cooled down to room temperature, or hot-dip coated in a bath then cooled down to room temperature, as described in further details below.

In another embodiment, the steel sheet being a hot-rolled or a cold-rolled steel sheet, the annealing temperature $T_A$ is comprised between 650° C. and Ae3, Ae3 designating the equilibrium transformation temperature, above which austenite is completely stable. One skilled in the art knows how to determine Ae3 by thermodynamic calculation or through tests involving heating and isothermal holding.

In this embodiment, the structure of the steel sheet at the annealing temperature $T_A$, and after the holding at the annealing temperature, is not entirely austenitic but comprises ferrite.

During the holding at the annealing temperature $T_A$, the partitioning of manganese to the austenite is completed.

In this embodiment, after the holding at the annealing temperature $T_A$, the steel sheet is for example immediately cooled down to room temperature, or hot-dip coated then cooled down to room temperature, as disclosed in further details below.

Indeed, the annealing temperature $T_A$ being lower than Ae3, the annealed steel sheet thus obtained has a structure comprising ferrite, so that the annealed steel sheet can be more easily cut to produce a blank after cooling down to room temperature.

However, if necessary, depending on the hardness of the sheet, the tempering treatment disclosed above may be performed to facilitate the further cutting of the sheet to obtain a blank.

After the holding at the annealing temperature $T_A$, whether higher or lower than Ae3, and the optional tempering treatment, the further steps of the process depend on the type of sheet which is to be manufactured:

if an uncoated steel sheet is to be produced, the steel sheet is cooled down from the annealing temperature $T_A$ or from the tempering temperature Tt to room temperature, if a pre-coated steel sheet is to be produced, the annealed steel sheet is cooled from the annealing temperature $T_A$, or brought from the tempering temperature Tt, if applicable (i.e. if the tempering temperature does not equal the desired pre-coating temperature), to a pre-coating temperature $T_{pc}$, then pre-coated with a metallic pre-coating by continuous hot-dip coating in a bath, then cooled down to room temperature.

The pre-coating temperature $T_{pc}$ is close to the temperature $T_{bm}$ of the pre-coating bath, to prevent a thermal disruption of the bath. For this reason, the pre-coating temperature $T_{pc}$ is preferably comprised $T_{bm}-10°$ C. and $T_{bm}+50°$ C.

If the desired pre-coating is aluminum, aluminum-based alloy or aluminium alloy, the steel sheet is continuously hot-dip coated in a bath at a temperature of about 650-680° C., the exact temperature depending on the composition of the aluminium based alloy or the aluminium alloy. A preferred pre-coating is Al—Si which is obtained by hot-dipping the sheet in a bath comprising, by weight, from 5% to 11% of Si, from 2% to 4% of Fe, optionally from 0.0015 to 0.0030% of Ca, the remainder being Al and impurities.

The sheet is thereafter cooled to room temperature. As an option, this Al, Al-based, or Al alloy pre-coated sheet can be submitted to a further heat treatment, at a temperature and during a time selected to as to obtain a pre-coating containing at least one intermetallic layer containing Al and iron, and optionally silicon, and containing neither free Al, nor τ5 phase of $Fe_3Si_2Al_{12}$ type nor τ6 phase of $Fe_2Si_2Al_9$ type.

If the desired pre-coating is zinc, zinc-based alloy, or zinc alloy, the steel sheet is hot-dip coated in a bath at a temperature of about 460° C., the exact temperature depending on the composition of the zinc based alloy or the zinc alloy. The pre-coating may be continuous hot-dip galvanizing or galvannealing, i.e. including a heat treatment immediately after hot-dip galvanizing at about 450-520° C. so to obtain a pre-coating containing 7-11% Fe. A pre-coating obtained by galvanizing typically contains 0.25-0.70% Al, 0.01-0.1% Fe, the balance being zinc and unavoidable impurities resulting from processing. A pre-coating obtained by galvannealing typically comprises 0.15-0.4% Al, 6-15% Fe, the balance being zinc and unavoidable impurities resulting from processing.

The pre-coating can be a zinc-aluminum-magnesium alloy containing 1-15% Al, 0.5-5% Mg, 0.01-0.1% Fe, the balance being zinc and unavoidable impurities resulting from processing. The pre-coating can also be an alloy containing 4-6% Al, 0.01-0.1% Fe, the balance being zinc and unavoidable impurities resulting from processing.

The pre-coating can also be an aluminum-zinc alloy containing 40-45% Zn, 3-10% Fe and 1-3% Si, the balance being aluminum and unavoidable impurities resulting from processing.

As an option, the metallic pre-coating process can include the deposition of two layers, such that the metallic pre-coating is composed of a layer of aluminum, an aluminum-based alloy or an aluminum alloy, topped by a layer of zinc, a zinc-based alloy or a zinc alloy. This layer is for example deposited by electrodeposition or by vacuum deposition: PVD (Physical Vapor Deposition) and/or CVD (Chemical Vapor Deposition).

The annealed steel sheet thus obtained, which may be hot-rolled or cold-rolled, and which may be coated or uncoated, has a structure consisting of:
less than 50% of ferrite,
between 1% and 20% of retained austenite,
cementite, such that the surface density of cementite particles having a larger dimension higher than 60 nm is lower than $10^7/mm^2$,
the complement consisting of martensite,
the retained austenite having an average Mn content of at least 1.1*Mn %, wherein Mn % designates the Mn content in the steel composition.

In an embodiment, the annealing temperature TA being higher than Ae3, the structure comprises no ferrite.

Besides, if a pre-coated steel sheet is to be produced, the annealing is preferably performed so as to obtain, upon completion of the annealing, a decarburization of the surface of the steel sheet over a depth $p_{50\%}$ comprised between 6 and 30 micrometers, $p_{50\%}$ being the depth at which the carbon content is equal to 50% of the C content in the steel composition.

To that end, the annealing atmosphere within the continuous annealing or continuous hot dip coating line during heating and holding is for example within the following ranges:

$H_2$ between 2 vol % and 10 vol %, the remainder being $N_2$ and unavoidable impurities, with a dew point comprised between −15° C. and +60° C.

Decarburization can also be obtained by providing an excess amount of $O_2$ within the annealing atmosphere.

This might either be assured:

by a zoning during heating and holding, or by providing a part of the heating section and the soaking section with an atmosphere comprising between 0.05 vol % and 6 vol % of $O_2$, the remainder being $N_2$ and unavoidable impurities with a dew point between −60° C. and +60° C.

or by a passage in a direct flame furnace during the heating step where the atmosphere is the result of the combustion of a mixture of air and natural gas or fuel, with an air-to-natural gas ratio between 1 and 1.2, or by any other process providing $O_2$ contents comparable to the ones given above within the heating and/or holding section, or a part of the heating or holding section.

The process for manufacturing a press hardened part from the steel sheet according to the invention will now be described.

As explained above, the steel sheet according to the invention may be an unannealed hot-rolled steel sheet, a hot-rolled, annealed and pre-coated steel sheet, an unannealed cold-rolled steel sheet, a cold-rolled and annealed steel sheet, or a cold-rolled, annealed and pre-coated steel sheet.

First, the steel sheet is cut to a predetermined shape so as to obtain a flat blank, the geometry of which is in a defined relation to the final geometry of the intended part.

Optionally, before the heating and the hot press forming of the blank, the blank is cold formed to obtain a predeformed blank. This cold predeformation, intended to bring the blank more or less close to the final geometry of the intended part, makes it possible to reduce the amount of deformation in the next hot forming step.

Then, the blank, either flat or cold predeformed, is heated to a temperature Tm comprised between 800 and 950° C. The heating is performed in a heating device, for example a heating furnace. The heating means are not limited and can be radiation, induction, or resistance-based. The heated blank is held at the temperature Tm for a time tm comprised between 60 s and 600 s. These temperature-time ranges make it possible to obtain, at the end of the holding at the temperature Tm, a structure comprising between 70% and 100% of austenite, and up to 30% of ferrite.

If the temperature Tm is lower than 800° C., the final structure of the press hardened part comprises a too high fraction of ferrite, especially higher than 30%, so that a tensile strength TS of at least 1300 MPa is not achieved. A holding time tm at the temperature Tm lower than 60 s may also result in a too high fraction of ferrite in the final part, and to a tensile strength lower than 1300 MPa.

If the temperature Tm is higher than 950° C. and/or the holding time tm longer than 600 s, the heating and holding step may result in a too important coarsening of the grains of austenite upon heating, leading to a decrease in tensile and yield strengths of the final part.

Furthermore, if the blank is pre-coated, this heating and holding causes the interdiffusion of the pre-coating with the steel substrate. The term "pre-coating" is used to designate the alloy before heating, and "coating" the alloy layer formed during the heating that immediately precedes the hot stamping. The heat treatment in the furnace therefore modifies the nature of the pre-coating and its geometry because the thickness of the final coating is greater than that of the pre-coating. The coating created by alloying protects the underlying steel from oxidation and additional decarburization and is appropriate for subsequent hot forming, in particular in a stamping press. The alloying occurs over the entire thickness of the coating. Depending on the composition of the pre-coating, one or more intermetallic phases are created by interdiffusion in this alloy layer and/or an alloy in the form of a solid solution. The iron enrichment of the coating results in a rapid elevation of its melting point. The coating created also has the advantage that it is adherent and suitable for the potential hot forming operations and rapid cooling that are to follow. Thus, during the heating, intermetallic phases are temporarily or definitively created by interdiffusion, which make it possible to facilitate further deformation in the hot press and to prevent decarburization and oxidation of the steel surface.

After the heating and holding steps, the heated blank is extracted from the heating device. The heated blank is transferred into a forming press.

Owing to the high quenchability of the steel, no transformation of austenite into polygonal ferrite occurs during this transfer, so that the transfer duration Dt does not need to be limited to a low value to avoid such transformation. Of course, the transfer duration Dt must in any case be limited to avoid a decrease of the temperature of the blank below the desired hot forming temperature. The hot-forming temperature is generally of at least 450° C.

The heated blank is thereafter hot formed in the forming press, so as to obtain a formed part. During the forming step, the modes and quantities of deformation differ from one place to another because of the geometry of the final part and of the forming tools. For example, some zones may be in expansion, while others are deformed in restraint. Whatever the deformation mode, an equivalent deformation $\varepsilon_b$ can be defined at each location in the press hardened part, as $$\varepsilon_b = \frac{2}{\sqrt{3}}\sqrt{(\varepsilon_1^2 + \varepsilon_1\varepsilon_2 + \varepsilon_2^2)},$$

wherein $\varepsilon_1$ and $\varepsilon_2$ are the principal deformations. Thus, $\varepsilon_b$ expresses the amount of strain introduced by the hot forming process in each zone of the press hardened part.

For example, the press hardened steel part comprises at least one first hot deformed zone with an equivalent deformation $\varepsilon_b$ higher than 0.15, and at least one second zone having experienced the same cooling cycle in press hardening than the first hot deformed zone, wherein the equivalent deformation $\varepsilon_b$ is less than 0.05.

The part is then kept within the tooling of the forming press so as to ensure a proper cooling rate and to avoid part distortion due to shrinkage and phase transformations.

The part mainly cools by conduction through heat transfer with the tools. The tools may include coolant circulation so as to increase the cooling rate, or heating cartridges so as to lower cooling rates. Thus, the cooling rates can be adjusted through the implementation of such means. However, owing to the high quenchability of the steel, the cooling rate does not need to be adjusted to a high value to achieve a transformation of austenite to martensite upon cooling below Ms.

For obtaining a press hardened part according to the invention, the formed part is cooled to a cooling stop temperature $T_C$ lower than Ms-100° C., so as to obtain a partial transformation of the austenite into martensite.

In an embodiment, the cooling stop temperature $T_C$ is room temperature, for example between 20° C. and 30° C.

The formed part is then reheated from the cooling stop temperature Tc to a post treatment temperature $T_{PT}$ comprised between 350° C. and 550° C., and maintained at the post treatment temperature $T_{PT}$ for a holding time $t_{PT}$ comprised between 10 s and 600 s, for example between 10 s and 120 s.

The post treatment temperature $T_{PT}$ is preferably comprised between 350° C. and 450° C.

During this holding step, carbon partitions from the martensite to the austenite, thereby enriching and stabilizing the austenite and tempering of the martensite occurs.

The formed part is then cooled from the post treatment temperature $T_{PT}$ to room temperature, to obtain a press hardened steel part.

The cooling is for example performed in air. During this cooling, part of the austenite may transform into fresh martensite. However, owing to the stabilization of the austenite, especially by carbon, the fraction of fresh martensite which is created is lower than 5%.

The press hardened steel part thus obtained has a microstructure consisting of, in the majority of the part, in surface fraction:
  at least 50% of partitioned martensite,
  less than 30% of ferrite,
  at least 2% of retained austenite,
  cementite, such that the surface density of cementite particles having a larger dimension higher than 60 nm is lower than $10^7/mm^2$, and
  at most 5% of fresh martensite.

The partitioned martensite has an average C content lower than the nominal C content in the steel (i.e. the average C content of the press-hardened steel part), this low content resulting from the partitioning of carbon from the martensite to the austenite during the holding at the post treatment temperature $T_{PT}$.

The retained austenite has an average C content of at least 0.5%, this high content also resulting from the partitioning of carbon from the martensite to the austenite during the holding at the post treatment temperature $T_{PT}$.

Generally, the retained austenite has an average Mn content higher than 1.1*Mn %.

Generally, the ferrite grains, if any, have an average size of at most 1.5 μm.

The press hardened steel parts obtained through the described method have a thickness which is typically comprised between 0.7 mm and 5 mm.

The inventors have found a method to obtain high ductility in the zones of the press hardened part wherein high stress concentration could be experienced during the use of the part: when the zones in the forming press are deformed with an equivalent deformation $\varepsilon_b$ higher than 0.15, the structure of these deformed zones is finer.

Especially, the inventors have compared not deformed or little deformed zones (the later designating zones wherein $\varepsilon_b<0.05$) with zones wherein deformation has been applied with an amount higher than 0.15. The hardness of the highly deformed (or strained) zones, generally increases of at least 15 HV1 (HV1 being the Vickers Hardness measured under 1 kgf load) as compared to unstrained or little strained zones in the press hardened part.

However, this hardness increase is at least compensated for by a decrease of the martensitic lath size.

The average martensitic (partitioned and fresh, if any) lath width in little or highly deformed zones has be measured. After ESBD analysis to reveal the microstructure, the lath width is determined by the intercept method which is known per se. It has been put into evidence that the application of an equivalent deformation higher than 0.15 reduces the average lath width of more than 15%, as compared to little deformed zones. This reduction of the lath width increases the resistance to eventual crack initiation and propagation. Generally, in the zones wherein the applied deformation is higher than 0.15, the average martensitic lath width is less than 0.65 μm. By comparison, the average martensitic lath width in little deformed zones is generally higher than 0.75 μm.

Besides, it has been put into evidence that the application of an equivalent deformation higher than 0.15 modifies the size distribution of the martensitic lath, as compared to little deformed zones.

Especially, the proportion of martensitic laths having a width lower than 0.8 μm is at least 35% higher in the highly deformed zones than in the little deformed zones.

This lower martensitic lath size provides especially a toughness increase.

Thus, the combination of the steel composition and of the press hardening parameters, makes it possible to achieve high ductility in targeted zones of the parts. In automobile applications, the formed parts display higher ductility in case of collisions.

Another object of the invention is a laser welded steel blank pre-coated with an aluminum, aluminum based alloy or aluminum alloy pre-coating, and a press hardened laser welded steel part coated with an aluminum based alloy or aluminum alloy coating.

The laser welded steel blank comprises at least a first steel blank, obtained from a steel sheet according to the invention and pre-coated with an aluminum, aluminum based alloy or aluminum alloy pre-coating, a second steel blank, also pre-coated with an aluminum, aluminum based alloy or aluminum alloy pre-coating, and a laser weld joining the first blank to the second blank. The steel blanks may have the same compositions or different compositions, and the same thickness or different thicknesses. In the case of different compositions, it has been put into evidence that the carbon content of the second steel blank has to be comprised between 0.04% and 0.38% in weight, preferably between 0.065% and 0.38%, in order to create a weld having the desired ductility properties.

For example, the second steel blank is made of a steel having a chemical composition comprising, by weight percent:
  0.04%≤C≤0.38%,
  0.05%≤Mn≤4.2%,
  0.001%≤Si≤1.5%,
  0.005%≤Al≤0.9%,
  0.001%≤Cr≤2%,
  Mo≤0.65%,
  Ni≤2%, 0.001%≤Ti≤0.2%,
Nb≤0.1%,
B≤0.010%,
0.0005%≤N≤0.010%,
0.0001%≤S≤0.05%,
0.0001%≤P≤0.1%,
W≤0.30%,
Ca≤0.006%,
the remainder being iron and unavoidable impurities.

Preferably, the C content is of at least 0.065%.

In a first embodiment, the second steel blank has a composition comprising, by weight percent: 0.04%≤C≤0.100%, 0.80%≤Mn≤2.0%, 0.005%≤Si≤0.30%, 0.010%≤Al≤0.070%, 0.001%≤Cr≤0.10%, 0.001%≤Ni≤0.10%, 0.03%≤Ti≤0.08%, 0.015%≤Nb≤0.1%, 0.0005%≤N≤0.009%, 0.0001%≤S≤0.005%, 0.0001%≤P≤0.030%, Mo≤0.10%, Ca≤0.006%, the remainder being iron and unavoidable impurities.

In a second embodiment, the second blank has a composition comprising, by weight percent: 0.065%≤C≤0.095%, 1.4%≤Mn≤1.9%, 0.2%≤Si≤0.5%, 0.020%≤Al≤0.070%, 0.02%≤Cr≤0.1%, wherein 1.5%≤(C+Mn+Si+Cr)≤2.7%, 3.4×N≤Ti≤8×N, 0.04%≤Nb≤0.06%, wherein 0.044%≤(Nb+Ti)≤0.09%, 0.0005%≤B≤0.004%, 0.001%≤N≤0.009%, 0.0005%≤S≤0.003%, 0.001%≤P≤0.020% and optionally 0.0001%≤Ca≤0.006%, the remainder being iron and unavoidable impurities.

In a third embodiment, the second blank has a composition comprising, by weight percent: 0.15%≤C≤0.38%, 0.5%≤Mn≤3%, 0.10%≤Si≤0.5%, 0.005%≤Al≤0.1%, 0.01%≤Cr≤1%, 0.001%≤Ti<0.2%, 0.0005%≤B≤0.010%, 0.0005%≤N≤0.010%, 0.0001%≤S≤0.05%, 0.0001%≤P≤0.1%, the remainder being iron and unavoidable impurities.

In a fourth embodiment, the second blank has a composition comprising, by weight percent: 0.24%≤C≤0.38%, 0.40%≤Mn≤3%, 0.10%≤Si≤0.70%, 0.015%≤Al≤0.070%, 0.001%≤Cr≤2%, 0.25%≤Ni≤2%, 0.015%≤Ti≤0.1%, 0%≤Nb≤0.06%, 0.0005%≤B≤0.0040%, 0.003%≤N≤0.010%, 0.0001%≤S≤0.005%, 0.0001%≤P≤0.025%, the Ti and N contents satisfying the following relationship: Ti/N>3.42, the C, manganese, Cr and Si contents satisfying the following relationship:

$$2.6C + \frac{Mn}{5.3} + \frac{Cr}{13} + \frac{Si}{15} \geq 1.1\%,$$

the chemical composition optionally comprising one of several of the following elements: 0.05%≤Mo≤0.65%, 0.001%≤W≤0.30%, 0.0005%≤Ca≤0.005%, the remainder being iron and unavoidable impurities.

In a fifth embodiment, the second steel blank has a composition according to the invention, comprising, by weight percent: 0.15%≤C≤0.22%, 3.5%≤Mn<4.2%, 0.001%≤Si≤1.5%, 0.020%≤Al≤0.9%, 0.001%≤Cr≤1%, 0.001%≤Mo≤0.3%, 0.001%≤Ti≤0.040%, 0.0003%≤B≤0.004%, 0.001%≤Nb≤0.060%, 0.001%≤N≤0.009%, 0.0005%≤S≤0.003%, 0.001%≤P≤0.020%, optionally 0.0001%≤Ca≤0.003%, the remainder being iron and unavoidable impurities.

The laser welded steel blank is obtained by cutting a steel sheet according to the invention and pre-coated with an aluminum, aluminum based alloy or aluminum alloy pre-coating, to obtain a first blank, cutting a steel sheet, which is for example a steel sheet according to the invention, also pre-coated with an aluminum, aluminum based alloy or aluminum alloy pre-coating to obtain a second blank. For example, the second blank has a composition as defined above, and preferably according to the first, second, third, fourth or fifth embodiment.

The first and second blanks are welded along one of their respective peripheral sides. Owing to the high Mn content in the composition of the steel of the invention, no ablation of all the pre-coating of the upper and lower sides of the blanks is needed before welding. For example, at least one side of one of the blanks is not subjected to an ablation, or is not subjected to an ablation of all the pre-coating.

Indeed, the gammageneous effect of the Mn in the steel and consequently in the weld counterweights the effect of the Al in the weld, resulting from the melting of the pre-coating and the incorporation of the melted pre-coating in the weld.

Therefore, according to the invention, no such ablation of all the pre-coating of the upper and lower sides of the blanks is performed before welding.

Thus, after the welding, the aluminum, aluminum-based alloy or aluminum alloy pre-coatings of the first and seconds blanks cover the immediate vicinity of the laser weld on a at least one side of the first and second steel blanks.

The laser welded blank thus obtained may then be hot formed and press hardened in the conditions described above, without the risk of cracks during hot forming. The press hardened welded part thus obtained, wherein the weld metal and the first and second blanks have been press hardened in the same operation, displays high mechanical resistance and ductility properties. Especially, the press hardened laser weld joining the first press hardened part, resulting from the hot forming of the first blank, and the second press hardened part, resulting from the hot forming of the second blank, has a structure comprising at most 15% of ferrite.

In addition, since no such ablation of all the pre-coating of the upper and lower sides of the blanks was performed before welding, the press hardened welded part is such that, on at least one side of the first and second press hardened steel parts, the thickness of the coating in the Heat Affected Zone is the same as the thickness of the coating in the rest of the first and second press hardened steel parts.

Another object of the invention is a welded assembly comprising a first press hardened steel part and a second press hardened steel part welded together by resistance spot welding. The first press hardened steel part is according to the invention, and the second press hardened steel part may be according to the invention or have a different composition. Especially, the first and second parts may have the same compositions or different compositions, and the same thickness or different thicknesses.

For example, the second part is made of a steel having a chemical composition comprising, by weight percent:
0.04%≤C≤0.38%,
0.05%≤Mn≤4.2%,
0.001%≤Si≤1.5%,
0.005%≤Al≤0.9%,
0.001%≤Cr≤2%,
Mo≤0.65%,
Ni≤2%,
0.001%≤Ti≤0.2%,
Nb≤0.1%,
B≤0.010%,
0.0005%≤N≤0.010%,
0.0001%≤S≤0.05%,
0.0001%≤P≤0.1%, W≤0.30%,
Ca≤0.006%,
the remainder being iron and unavoidable impurities.

Preferably, the C content in the second part is of at least 0.065%.

For example, the composition of the second steel part may be in accordance with the composition of the first, second, third, fourth or fifth embodiments described above with respect to the second blank.

The welded assembly is manufactured by producing the first and second press hardened steel parts, and resistance spot welding the first and second steel parts.

The resistance spot welds joining the first part to the second parts are characterized by a high resistance in cross-tensile test defined by an alpha value of at least 50 daN/mm², and a plug ratio of at least 0.70.

Here, the alpha value designates the maximum load in cross test divided by the weld diameter and the thickness. It is a normalized load for resistant spot welding expressed in daN/mm².

The plug ratio is equal to the plug diameter divided by the molten zone (MZ) diameter. The lower the plug ratio, the lower the molten zone ductility.

Generally, the softening in the Heat Affected Zone, i.e. the difference between the Vickers hardness of the base steel and the Vickers hardness in the Heat Affected Zone, is lower than 25% of the Vickers hardness of the base steel.

Another object of the invention is a welded assembly comprising a first press hardened steel part and a second steel part welded together by resistance spot welding, the first press hardened steel part being according to the invention, and the second steel part being a hot-stamped or cold-stamped steel part, having a tensile strength not higher than 2100 MPa. Preferably, the second steel part has a C content not higher than 0.38% and a Mn content not higher than 4.2%.

The invention will be now illustrated by the following examples, which are by no way limitative.

Steels with composition according to Table 1, expressed in weight percentage, were provided under the form of slabs. The temperatures Ae3, determined by thermodynamic calculation, are reported in Table 1 below.

TABLE 1

| Ref. | C (%) | Mn (%) | Si (%) | Al (%) | Cr (%) | Mo (%) | Nb (%) | B (%) | Ti (%) | N (%) | S (%) | P (%) | Ae3 (° C.) |
|---|---|---|---|---|---|---|---|---|---|---|---|---|---|
| I1 | 0.186 | 3.67 | 0.69 | 0.37 | 0.001 | 0.201 | 0.027 | 0.0013 | 0.026 | 0.0039 | 0.0011 | 0.01 | 790 |
| I2 | 0.186 | 3.62 | 0.97 | 0.39 | 0.001 | 0.19 | 0.027 | 0.0020 | 0.025 | 0.0046 | 0.0010 | 0.009 | 800 |
| I3 | 0.184 | 3.69 | 1.15 | 0.37 | 0.001 | 0.196 | 0.028 | 0.0018 | 0.026 | 0.0049 | 0.0011 | 0.01 | 805 |
| I4 | 0.19 | 3.97 | 1.22 | 0.44 | 0.52 | 0.2 | 0.02 | 0.0018 | 0.04 | 0.0051 | 0.0012 | 0.009 | 845 |
| I5 | 0.15 | 3.78 | 1.46 | 0.79 | 0.001 | 0.187 | 0.058 | 0.0003 | 0.001 | 0.003 | 0.001 | 0.009 | 780 |
| I6 | 0.18 | 3.62 | 1.03 | 0.806 | 0.001 | 0.207 | 0.001 | 0.0014 | 0.023 | 0.005 | 0.001 | 0.014 | 770 |
| I7 | 0.18 | 3.97 | 1.5 | 0.033 | 0.001 | 0.21 | 0.001 | 0.0028 | 0.016 | 0.003 | 0.0022 | 0.008 | 780 |
| I8 | 0.164 | 3.650 | 0.634 | 0.388 | 0.015 | 0.211 | 0.027 | 0.0009 | 0.026 | 0.0057 | 0.0018 | 0.011 | 800 |
| R1 | 0.218 | 4.49 | 1.5 | 0.019 | 0.047 | 0.002 | 0.001 | 0.0004 | 0.001 | 0.0021 | 0.0049 | 0.006 | 742 |
| R2 | 0.297 | 2.5 | 1.5 | 0.006 | 0.001 | — | — | — | — | 0.0022 | 0.0044 | 0.001 | 790 |
| R3 | 0.174 | 3.58 | 1 | — | — | — | — | — | — | 0.005 | 0.001 | 0.01 | 770 |
| R4 | 0.127 | 5 | 0.47 | 1.72 | 0.003 | 0.001 | 0.015 | 0.0008 | 0.001 | 0.0022 | 0.0045 | 0.012 | 960 |
| R5 | 0.22 | 1.16 | 0.26 | 0.03 | 0.17 | 0.001 | 0.001 | 0.003 | 0.035 | 0.005 | 0.001 | 0.012 | 810 |

The slabs were heated to a temperature $T_h$, hot-rolled and coiled at a coiling temperature $T_{coil}$. The hot-rolled steel sheets were then pickled, optionally batch annealed at a batch annealing temperature $T_{HBA}$, with a holding time $t_{HBA}$ at the temperature $T_{HBA}$, pickled, then cold-rolled with a cold-rolling reduction ratio $r_{CR}$ to obtain cold-rolled steel sheets having a thickness th.

Some of the cold-rolled steel sheets were then annealed at an annealing temperature $T_A$ for an annealing time $t_A$. Some of the sheets were pre-coated with an Al—Si coating, by hot-dipping in a bath comprising, by weight, from 5% to 11% of Si, from 2% to 4% of Fe, optionally from 0.0015 to 0.0030% of Ca, the remainder being Al and impurities.

The manufacturing conditions (A, B . . . ) of the annealed steel sheets are summarized in Table 2 below.

TABLE 2

| | $T_h$ (° C.) | $T_{coil}$ (° C.) | $T_{HBA}$ (° C.) | $t_{HBA}$ (h) | $r_{CR}$ (%) | $t_h$ (mm) | $T_A$ (° C.) | $t_A$ (s) | Pre-coating |
|---|---|---|---|---|---|---|---|---|---|
| A | 1250 | 450 | 620 | 5 | 60 | 1.25 | 780 | 60 | — |
| B | 1250 | 450 | 650 | 7 | 50 | 1.2 | — | — | — |
| C | 1250 | 450 | 600 | 7 | 50 | 1.2 | — | — | — |
| D | 1250 | 450 | 600 | 5 | 50 | 1.2 | 780 | 120 | — |
| E | 1250 | 580 | — | — | 50 | 1.5 | 830 | 60 | Al—Si |
| G | 1250 | 450 | 600 | 7 | 50 | 1.2 | 800 | 60 | — |
| H | 1250 | 450 | 600 | 5 | 50 | 1.2 | — | — | — |
| I | 1250 | 560 | — | — | 50 | 1 | — | — | — |

The Charpy energy of some of the hot-rolled sheets was determined before the batch annealing, at 25° C. Especially, Charpy impact specimen 55×10 mm², with V notches 2 mm deep, with an angle of 45° and 0.25 mm root radius were collected from hot-rolled steel sheets before batch annealing, and the specific impact energy ("Charpy energy") KCv was measured.

The results are reported in Table 3 below. By convention, the test conditions associate the steel composition and the manufacturing conditions of the sheet. Thus, I1A refers for example to a hot-rolled steel sheet obtained from the steel composition I1, produced with the temperature $T_h$ and the coiling temperature $T_{coil}$ of condition A.

TABLE 3

| Conditions | KCv after hot rolling and before batch annealing (J/cm²) |
|---|---|
| I1A | 77 |
| I2A | 79 |

TABLE 3-continued

| Conditions | KCv after hot rolling and before batch annealing (J/cm²) |
|---|---|
| I3A | 77 |
| I4B | 64 |
| I5C | 71 |
| I6B | 90 |

TABLE 3-continued

| Conditions | KCv after hot rolling and before batch annealing (J/cm²) |
|---|---|
| I7C | 65 |
| I8A | 96 |
| R3B | 29 |
| R4G | 98 |

Examples I1A, I2A, I3A, I4B, I5C, I6B, I7C and I8A, having a composition according to the invention and produced with temperatures $T_h$ and coiling temperatures $T_{coil}$ according to the invention, have a very high Charpy energy at 25° C., of at least 60 J/cm².

By contrast, example R3B has a composition comprising no B and no Al. As a consequence, example R3B, though produced with a temperature $T_h$ and a coiling temperature $T_{coil}$ according to the invention, has a low Charpy energy.

The cold-rolled sheets were then cut to obtain blanks. The blanks were heated to a temperature $T_m$ and held at this temperature $T_m$ for a holding time $t_m$, so as to obtain heated steel blanks having a structure comprising between 70% and 100% of austenite.

The heated blanks were then transferred to a forming press and hot-formed so as to obtain formed parts.

Some formed parts were cooled to a cooling stop temperature $T_C$, then reheated from the cooling stop temperature $T_C$ to a post treatment temperature $T_{PT}$, and maintained at the post treatment temperature $T_{PT}$ for a holding time $t_{PT}$.

The parts were then air cooled to room temperature.

Other parts were cooled to room temperature directly after hot forming, without any post treatment (condition h).

The manufacturing conditions (a, b . . . ) of the press hardened parts are summarized in Table 4 below.

The yield strength YS and the tensile strength TS have been determined on the press hardened parts, using 12.5×50 mm² specimens according to Standard ISO (EN 6892-1-2009).

TABLE 4

| Condition | $T_m$ (° C.) | $t_m$ (s) | $T_c$ (° C.) | $T_{PT}$ (° C.) | $t_{PT}$ (s) |
|---|---|---|---|---|---|
| a | 820 | 120 | 25 | 400 | 60 |
| b | 880 | 120 | 25 | 400 | 60 |
| c | 880 | 120 | 25 | 400 | 300 |
| d | 880 | 120 | 150 | 400 | 60 |
| e | 880 | 120 | 180 | 400 | 60 |
| f | 850 | 150 | 130 | 400 | 220 |
| g | 740 | 120 | 275 | 290 | 340 |
| h | 900 | 240 | 25 | - | - |
| i | 900 | 100 | 180 | 400 | 220 |
| j | 900 | 100 | 160 | 400 | 220 |
| k | 810 | 100 | 140 | 400 | 200 |
| l | 850 | 90 | 150 | 425 | 200 |
| m | 900 | 120 | 25 | 400 | 60 |
| n | 800 | 120 | 25 | 400 | 60 |
| o | 820 | 120 | 25 | 400 | 60 |
| p | 800 | 120 | 25 | 400 | 60 |
| q | 840 | 100 | 240 | 400 | 500 |
| r | 800 | 180 | 140 | 400 | 500 |

Critical bending angle has been determined on press hardened parts of 60×60 mm² supported by two rollers, according to the method B of the VDA-238 bending Standard (with normalizing to a thickness of 1.5 mm). The bending effort is exerted by a 0.4 mm radius sharp punch. The spacing between the rollers and the punch is equal to the thickness of the tested parts, a clearance of 0.5 mm being added. The crack apparition is detected since it coincides with a load decrease in the load-displacement curve. Tests are interrupted when the load decreases more than 30N of its maximal value. The bending angle (α) of each sample is measured after unloading and thus after specimen springback. Three samples along each direction (rolling direction and transverse direction) are bent so to obtain an average value $\alpha_A$ of the bending angle The fracture strain is determined through bending specimens in plane strain conditions, which is the most severe condition in view of vehicle collision. From these tests, it is possible to determine the critical displacement of the specimens when fracture occurs. On the other hand, Finite Element Analysis allows modeling the bending of such specimen, i.e. to know the strain level which is present in the bent zone for such critical displacement. This strain in such critical conditions is the fracture strain of the material.

The results of such mechanical tests are presented in Table 5. By convention, the test conditions associate the steel composition, the manufacturing conditions of the sheet and the manufacturing conditions of the press hardened part. Thus, I1Aa refers for example to a press hardened part obtained from the steel composition I1, produced by subjecting a steel sheet manufactured with condition A to the press-hardening condition a.

Table 5 presents also some microstructural features of the press hardened parts. The surface fractions of the different constituents have been determined by polishing and etching the specimens with different reagents (Nital, Picral, Bechet-Beaujard, sodium metabisulfite and LePera) so to reveal the specific constituents. Quantification of the surface fractions have been performed through image analysis and Aphelion™ software, on more than ten representative zones of at least 100×100 µm².

The fraction of retained austenite was determined by X-ray diffraction (XRD). The C content in the retained austenite was determined by assessing the retained austenite fraction and the lattice parameters by an X-ray diffraction (XRD) analysis, with a Rietveld refinement, and by using the Dyson and Holmes formulae.

In table 5, Ms designates the temperature at which transformation of the austenite present in the structure to martensite starts upon cooling, as determined by dilatometry. The temperature Ms, depending for each steel composition on the composition and on the manufacturing conditions, especially on the temperature $T_m$, is therefore reported in Table 5 for each steel composition and manufacturing condition.

Besides, in table 5, PM designates the partitioned martensite fraction, FM designates the fresh martensite fraction, F designates the ferrite fraction, $d_{cm}$ designates the surface density of cementite particles having a larger dimension higher than 60 nm, RA designates the retained austenite fraction, $C_{RA}$ is the average C content in the retained austenite.

Besides, YS is the yield strength, TS the tensile strength and $\alpha_A$ the bending angle (expressed in degrees).

TABLE 5

| Test | Ms (° C.) | PM (%) | FM (%) | F (%) | $d_{cm}$ (mm$^{-2}$) | RA (%) | $C_{RA}$ (%) | YS (MPa) | TS (MPa) | $\alpha_A$ (°) | Fracture strain |
|---|---|---|---|---|---|---|---|---|---|---|---|
| I1Aa | 285 | 85 | 0 | 6 | 1*10^6 | 9 | 0.75 | 1342 | 1411 | 63 | 0.53 |
| I1Ab | 310 | >90 | 0 | <2 | 2*10^6 | 7 | 0.69 | 1258 | 1393 | 72 | 0.63 |
| I2Aa | 280 | 82 | 0 | 9 | 0.5*10^6 | 9 | 0.74 | 1305 | 1428 | 68 | 0.56 |
| I2Ab | 305 | >90 | 0 | <2 | 3*10^6 | 7 | 0.80 | 1349 | 1416 | 68 | 0.51 |
| I2Ad | 305 | >90 | 0 | <2 | 2.5*10^6 | 9 | 0.73 | 1217 | 1359 | 71 | 0.56 |
| I2Ae | 305 | >90 | 0 | <2 | 2.5*10^6 | 10 | 0.67 | 1184 | 1344 | 76 | 0.6 |
| I3Aa | 275 | 75 | 0 | 15 | 0.5*10^6 | 10 | 0.81 | 1317 | 1429 | 65 | 0.54 |
| I3Ab | 315 | >90 | 0 | <2 | 1.5*10^6 | 8 | 0.83 | 1272 | 1426 | 74 | 0.63 |
| I4Bf | 315 | 80 | 2 | <5 | 2*10^6 | 13 | 0.78 | 1256 | 1407 | n.d. | n.d. |
| I5Ci | 320 | 93 | 0 | 0 | 5*10^6 | 7 | 0.8 | 1236 | 1325 | n.d. | n.d. |
| I5Cj | 320 | 94 | 0 | 0 | 5*10^6 | 6 | 0.83 | 1238 | 1328 | n.d. | n.d. |
| I7Ck | 290 | 90 | 0 | 0 | 7*10^6 | 10 | 0.8 | 1283 | 1391 | n.d. | n.d. |
| I7Cl | 290 | 87.5 | 0 | 0 | 7*10^6 | 12.5 | 0.76 | 1241 | 1384 | n.d. | n.d. |
| R1Dn | 275 | >70 | 0 | <2 | 1.5*10^6 | n.d. | n.d. | 1373 | 1584 | 48 | 0.42 |
| R1Do | 275 | >70 | 0 | <2 | 1*10^6 | n.d. | n.d. | 1333 | 1530 | 58 | 0.37 |
| R4Gc | 270 | >75 | <5 | 15 | 0.5*10^6 | 4 | 0.71 | 1230 | 1264 | 69 | 0.54 |
| R5Eh | 410 | 3 | 97 | 0 | n.d. | 0 | NA | 1162 | 1504 | 61 | 0.37 |

In this Table 5, n.d. means "not determined" and NA means "not applicable".

In the trials I1Aa, I1Ab, I2Aa, I2Ab, I2Ad, I2Ae, I3Aa, I3Ab, I4Bf, I5Ci, I5Cj, I7Ck and I7Cl, compositions, conditions for manufacturing the steel sheets and press hardening conditions correspond to the invention and the desired microstructural features are obtained. As a consequence, high tensile properties and high crash ductility, especially high bending angles and fracture strains, are achieved.

The microstructure of sample I1Ab is shown in the appended FIGURE, wherein "RA" designates retained austenite, and "PM" designates partitioned martensite.

In the trials R1Dn and R1Do, the Mn and S contents do not fulfill the conditions of invention. Even if the conditions for manufacturing the steel sheets and the press hardening conditions are in accordance with the ranges of the invention, the crash ductility, especially the bending angle and fracture strain do not meet the requested values.

In the trial R4Gc, the C, Mn, Al and S contents do not fulfill the conditions of invention. Even if the conditions for manufacturing the steel sheets and the press hardening conditions are in accordance with the ranges of the invention, the tensile strength does not reach 1300 MPa.

In the trial R5Eh, the Mn content is too low. In addition, no post treatment was performed after hot forming. Consequently, the structure comprises a high fraction of fresh martensite. Even if the yield and tensile strengths reach the targeted values, the crash ductility, especially the fracture strain, is not satisfactory.

Besides, the inventors assessed the weldability of the steel sheets and press hardened parts obtained with the manufacturing conditions described above.

Especially, resistance spot welding tests was performed on some of the press hardened parts. Press-hardened parts produced under various test conditions were resistance spot welded with the welding parameters reported in Table 6, and with an intensity comprised between 5 and 8 kA, it being understood that each part was welded to another part produced under the same test conditions.

Hardness tests were performed on cut and polished resistance spot welds in order to determine an eventual softening in the Heat Affected Zones in the vicinity of the metal weld. This softening is measured by the difference between the base metal hardness and the minimum hardness value in the Heat Affected Zone. Tensile tests were performed on resistance spot welds, and the total elongation of the welds was measured. As compared to the base metal elongation, the welds cause an elongation variation which may be more or less pronounced as compared to the one of the base metal. Thus, the relative elongation variation is defined by: (base metal elongation-weld elongation)/base metal elongation.

The parameters and results are reported in Table 6, wherein:

"Test condition" designates the press hardened part on which the resistance spot welding test was performed, "Welding force" designates the welding force, expressed in daN, during the spot welding, "alpha" designates the alpha value, i.e. the maximum load in cross test divided by the weld diameter and the thickness, expressed in daN/mm$^2$, "Plug ratio" designates the plug ratio, equal to the plug diameter divided by the molten zone (MZ) diameter, "HAZ softening" designates the difference between the base metal Vickers hardness and the minimum Vickers hardness value in the Heat Affected Zone, a. "relative softening" is the ratio between the HAZ softening and the base metal Vickers hardness, expressed in percentage.

TABLE 6

| Test condition | Welding force (daN) | Alpha (daN/mm$^2$) | Plug ratio | HAZ softening (Hv) | Relative softening (%) |
|---|---|---|---|---|---|
| I4Bf | 400 | 51 | 0.86 | 101 | 20.3 |
| I5Ci | 400 | 64 | 0.82 | n.d. | n.d. |
| I6Bm | 400 | 70 | 0.86 | 84 | 18.6 |
| I7Ok | 400 | 60 | 0.81 | n.d. | n.d. |
| I8Ab | 400 | 75 | 0.8 | 95 | 21 |
| R1Hr | 400 | 24 | 0 | 20 | 5 |
| R2Iq | 400 | 29 | 0.36 | 50 | 13 |
| R3Bp | 400 | 41.6 | 0.62 | 45 | 10.2 |
| R4Gg | 400 | 85 | 1 | n.d. | n.d. |
| R5Eh | 450 | 70 | 0.87 | 200 | 40 |

In Table 6, n.d. means "not determined".

The examples I4Bf, I5Ci, I6Bm, I7Ck and I8Ab are made of steels having a composition according to the invention, and were produced with manufacturing conditions corresponding to the invention. As a consequence, the resistance spot welds produced by resistance spot welding these parts have a high ductility, characterized by an alpha value of at least 50 daN/mm$^2$ and a plug ratio of at least 0.70.

By contrast, example R1Hr is made of a steel having a too high Mn content. As a consequence, the resistance spot welds produced by resistance spot welding two parts R1Hr have a low ductility, especially an alpha value lower than 50 daN/mm² and a plug ratio lower than 0.70.

Besides, example R2Iq is made of a steel having a too high C content. As a consequence, the resistance spot welds produced by resistance spot welding two parts R2Iq have a low ductility, especially an alpha value lower than 50 daN/mm² and a plug ratio lower than 0.70. The HAZ softening is less pronounced in the press hardened part I4Bf, I6Bm and I8Ab, manufactured according to the invention, than in the reference part R5Eh, in which a significant elongation loss is present in the HAZ.

Thus, the steel parts manufactured according to the invention can be used with advantage for the fabrication of structural or safety parts of vehicles.

What is claimed is:

1. A press hardened steel part, made of a steel having a composition comprising, by weight:
   0.15%<C<0.22%
   3.5%<Mn<4.2%
   0.001%<Si<1.5%
   0.020%<Al<0.9%
   0.001%<Cr<1%
   0.001%<Mo<0.3%
   0.001%<Ti<0.040%
   0.0003%<B<0.004%
   0.001%<Nb<0.060%
   0.001%<N<0.009%
   0.0005%<S<0.003%
   0.001%<P<0.020%
   a remainder being iron and unavoidable impurities,
   wherein the at least 95% of a volume of the press hardened steel part has a microstructure consisting of in surface fraction:
   at least 50% of partitioned martensite,
   less than 30% of ferrite,
   at least 2% of retained austenite, cementite such that a surface density of cementite particles having a larger dimension higher than 60 nm is lower than $10^7$/mm²,
   and at most 2% of fresh martensite,
   the retained austenite having an average C content of at least 0.5% by weight.

2. The press hardened steel part according to claim 1, wherein the retained austenite has an average Mn content of at least 1.1*Mn %, wherein Mn % designates the Mn content in the composition.

3. The press hardened steel part according to claim 1, wherein:
   0.9%≤Al≤0.3%.

4. The press hardened steel part according to claim 1, wherein said press hardened steel part is coated with a metallic coating.

5. The press hardened steel part according to claim 4, wherein said metallic coating is a zinc-based alloy, or a zinc alloy coating.

6. The press hardened steel part according to claim 4, wherein said metallic coating is an aluminum-based alloy, or an aluminum alloy coating.

7. The press hardened steel part according to claim 1, having a yield strength of at least 1000 MPa, a tensile strength comprised between 1300 and 1600 MPa, a fracture strain under plain strain condition higher than 0.50 and a bending angle higher than 60°, the bending angle being determined according to method B of VDA-238 bending Standard, with normalizing to a thickness of 1.5 mm.

8. The press hardened steel part according to claim 1, comprising at least one first hot deformed zone, having experienced a cooling cycle in press hardening, with an equivalent deformation $\varepsilon_b$ higher than 0.15, and at least one second zone having experienced the same cooling cycle in press hardening than the first hot deformed zone, wherein the equivalent deformation $\varepsilon_b$ is less than 0.05.

9. The press hardened steel part according to claim 8, wherein a difference in hardness between said second zone and said first hot deformed zone is more than 15 HV1.

10. The press hardened steel part according to claim 8, wherein an average martensitic lath width in said first hot deformed zone is reduced of more than 15% as compared to an average martensitic lath width in said second zone.

11. The press hardened steel part according to claim 8, wherein a proportion of martensitic lath having a width lower than 0.8 μm is at least 35% higher in the first hot deformed zone than in the second zone.

12. The press hardened steel part according to claim 1, wherein the press hardened steel part has a thickness comprised between 0.7 mm and 5 mm.

13. The press hardened steel part according to claim 1, wherein the composition further comprises 0.0001%≤Ca≤0.003%.

14. The press hardened steel part according to claim 1, wherein the press hardened part has a bending angle higher than 60° and a fracture strain under plain strain condition higher than 0.50.

15. A press hardened laser welded steel part, comprising
   a first press hardened steel part,
   a second press hardened steel part, and
   a press hardened laser weld joining the first press hardened steel part to the second press hardened steel part, the press hardened laser welded steel part including a Heat Affected Zone, wherein
   the first press hardened steel part is a part according to claim 6,
   the second press hardened steel part has a composition comprising between 0.04% and 0.38% of carbon, said second press hardened steel part being coated with an aluminum, an aluminum-based alloy or an aluminum alloy coating,
   said press hardened laser weld has a structure comprising at most 15% of ferrite, and
   on at least one side of the first and second press hardened steel parts, a thickness of the coating in the Heat Affected Zone is the same as a thickness of the coating in a rest of the first and second press hardened steel parts.

16. A welded assembly comprising a first steel part and a second steel part welded together by resistance spot welding, the welded assembly comprising at least one resistance spot weld joining the first steel part to the second steel part, wherein
   the first steel part is a press hardened steel part according to claim 1,
   the second steel part is made of a steel having a chemical composition comprising, by weight:
   0.04%≤C≤0.38%
   0.05%≤Mn≤4.2%
   0.001%≤Si≤1.5%
   0.005%≤Al≤0.9%
   0.001%≤Cr≤2%
   Mo≤0.65%
   Ni≤2%
   0.001%≤Ti≤0.2%
   Nb≤0.1%

B≤0.010%
0.0005%≤N≤0.010%
0.0001%≤S≤0.05%
0.0001%≤P≤0.1%
W≤0.30%
Ca≤0.006%
a remainder being iron and unavoidable impurities said resistance spot weld having an alpha value of at least 50 daN/mm² and a plug ratio of at least 0.70, the alpha value designating a maximum load in cross test divided by a diameter of the resistance spot weld and a thickness of the resistance spot weld, the plug ratio being equal to a plug diameter of the resistance spot weld divided by a molten zone (MZ) diameter of the resistance spot weld.

17. The welded assembly according to claim 16, wherein the first steel part has a composition such that Al≥0.3%, and a difference between a Vickers hardness of a base steel of the first steel part and a minimum Vickers hardness value in a Heat Affected Zone is lower than 25% of a Vickers hardness of the base steel of the first steel part.

18. A welded assembly comprising a first steel part and a second steel part welded together by resistance spot welding, the welded assembly comprising at least one resistance spot weld joining the first steel part to the second steel part, wherein the first steel part is a press hardened steel part according to claim 1, and the second steel part is a press hardened part, or a cold stamped or cold formed steel part, having a C content not higher than 0.38% and a Mn content not higher than 4.2%, with a tensile strength not higher than 2100 MPa.

19. An anti-intrusion part or an energy absorption part of an automotive vehicle comprising the press hardened steel part according to claim 1.

* * * * *